(12) United States Patent
Hruska et al.

(10) Patent No.: US 10,190,910 B2
(45) Date of Patent: Jan. 29, 2019

(54) OPTICAL FILTER AND SPECTROMETER

(71) Applicant: Viavi Solutions, Inc., Milpitas, CA (US)

(72) Inventors: Curtis R. Hruska, Cloverdale, CA (US); Benjamin F. Catching, Santa Rosa, CA (US); Paula Smith, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 15/488,948

(22) Filed: Apr. 17, 2017

(65) Prior Publication Data

US 2017/0219430 A1 Aug. 3, 2017

Related U.S. Application Data

(63) Continuation of application No. 14/608,356, filed on Jan. 29, 2015, now Pat. No. 9,625,628.

(Continued)

(51) Int. Cl.
*G01J 3/02* (2006.01)
*G01J 3/12* (2006.01)
(Continued)

(52) U.S. Cl.
CPC .......... *G01J 3/0229* (2013.01); *G01J 3/0208* (2013.01); *G01J 3/0259* (2013.01); *G01J 3/0262* (2013.01); *G01J 3/12* (2013.01); *G01J 3/26* (2013.01); *G01J 3/2803* (2013.01); *G02B 5/285* (2013.01); *G01J 2003/1213* (2013.01); *G01J 2003/1221* (2013.01); *G01J 2003/1234* (2013.01); *G01J 2003/2813* (2013.01)

(58) Field of Classification Search
None
See application file for complete search history.

(56) References Cited

U.S. PATENT DOCUMENTS 4,389,096 A 6/1983 Hori et al.
4,590,466 A 5/1986 Wiklund et al.
(Continued)

FOREIGN PATENT DOCUMENTS

CN 101900905 12/2010
CN 102741671 A 10/2012
(Continued)

OTHER PUBLICATIONS

Extended European Search Report corresponding to EP 15 74 3537, dated Aug. 7, 2017, 9 pages.
(Continued)

*Primary Examiner* — Shawn Decenzo
(74) *Attorney, Agent, or Firm* — Harrity & Harrity, LLP

(57) ABSTRACT

An optical filter is disclosed including two laterally variable bandpass filters stacked at a fixed distance from each other, so that the upstream filter functions as a spatial filter for the downstream filter. This happens because an oblique beam transmitted by the upstream filter is displaced laterally when impinging on the downstream filter. The lateral displacement causes a suppression of the oblique beam when transmission passbands at impinging locations of the oblique beam onto the upstream and downstream filters do not overlap.

20 Claims, 23 Drawing Sheets

Related U.S. Application Data

(60) Provisional application No. 61/934,547, filed on Jan. 31, 2014.

(51) Int. Cl.
*G01J 3/26* (2006.01)
*G01J 3/28* (2006.01)
*G02B 5/28* (2006.01)

(56) References Cited

U.S. PATENT DOCUMENTS

| | | | |
|---|---|---|---|
| 5,011,279 A | 4/1991 | Auweter et al. | |
| 5,166,755 A | 11/1992 | Gat | |
| 5,218,473 A | 6/1993 | Seddon et al. | |
| 5,272,518 A | 12/1993 | Vincent | |
| 5,784,158 A * | 7/1998 | Stanco | G01J 3/02 356/326 |
| 5,872,655 A | 2/1999 | Seddon et al. | |
| 5,949,082 A | 9/1999 | Schubert et al. | |
| 6,057,925 A | 5/2000 | Anthon | |
| 6,075,611 A | 6/2000 | Dussan | |
| 6,700,690 B1 * | 3/2004 | Buchsbaum | G02B 5/20 359/230 |
| 6,836,325 B2 | 12/2004 | Maczura | |
| 6,844,930 B2 | 1/2005 | Kobayashi et al. | |
| 6,909,548 B2 | 6/2005 | Duggan | |
| 7,420,663 B2 | 9/2008 | Wang et al. | |
| 7,460,247 B1 | 12/2008 | Ackerman | |
| 7,907,282 B2 | 3/2011 | Coates | |
| 8,159,668 B2 | 4/2012 | Malinen et al. | |
| 8,476,574 B1 * | 7/2013 | Brown | G01J 3/26 250/216 |
| 9,304,039 B2 | 4/2016 | Tack et al. | |
| 9,459,143 B2 | 10/2016 | Gunji | |
| 9,625,628 B2 | 4/2017 | Hruska et al. | |
| 2001/0028458 A1 | 10/2001 | Xiao | |
| 2001/0055116 A1 | 12/2001 | Maczura | |
| 2002/0026981 A1 | 3/2002 | Fukushima | |
| 2002/0039186 A1 | 4/2002 | Rosenberg | |
| 2002/0131047 A1 | 9/2002 | Zarrabian et al. | |
| 2004/0004551 A1 | 1/2004 | Early | |
| 2004/0054248 A1 | 3/2004 | Kimchy | |
| 2004/0218175 A1 | 11/2004 | Barkhoudarian | |
| 2005/0036145 A1 | 2/2005 | Meada | |
| 2005/0117156 A1 | 6/2005 | Siepmann et al. | |
| 2005/0213092 A1 | 9/2005 | MacKinnon et al. | |
| 2005/0243319 A1 | 11/2005 | Van Andel et al. | |
| 2006/0175547 A1 | 8/2006 | DiFoggio | |
| 2006/0228089 A1 | 10/2006 | Shimokozono et al. | |
| 2007/0068242 A1 | 3/2007 | DiFoggio | |
| 2008/0285165 A1 * | 11/2008 | Wu | G01J 3/02 359/885 |
| 2010/0110550 A1 | 5/2010 | Li et al. | |
| 2010/0140373 A1 | 6/2010 | Myhre | |
| 2010/0208348 A1 * | 8/2010 | Feke | A61B 5/0059 359/578 |
| 2012/0020185 A1 | 1/2012 | Welker | |
| 2012/0120403 A1 | 5/2012 | Funamoto | |
| 2012/0327248 A1 | 12/2012 | Tack et al. | |
| 2013/0141791 A1 | 6/2013 | Moore et al. | |
| 2013/0161544 A1 | 6/2013 | Ohnishi | |
| 2013/0265568 A1 | 10/2013 | Micheels et al. | |
| 2014/0113365 A1 | 4/2014 | Nagai et al. | |
| 2014/0320858 A1 | 10/2014 | Goldring et al. | |
| 2015/0153156 A1 | 6/2015 | Shah | |
| 2015/0153224 A1 | 6/2015 | Shibayama et al. | |
| 2015/0219484 A1 | 8/2015 | Hruska et al. | |
| 2015/0291993 A1 | 10/2015 | Vela | |
| 2017/0038305 A1 | 2/2017 | Catching et al. | |
| 2017/0038255 A1 | 9/2017 | Smith et al. | |

FOREIGN PATENT DOCUMENTS

| | | |
|---|---|---|
| CN | 102944305 | 2/2013 |
| CN | 103185637 | 7/2013 |
| CN | 103 278 861 A | 9/2013 |
| EP | 0 491 131 A1 | 10/1991 |
| EP | 0 295 546 A2 | 12/1998 |
| EP | 2600126 A2 | 6/2013 |
| JP | S5760231 A | 4/1982 |
| JP | S5922189 A | 2/1984 |
| JP | H04276527 A | 1/1992 |
| JP | H05322653 A | 12/1993 |
| JP | 2963752 | 10/1999 |
| JP | 2003510560 A | 3/2003 |
| JP | 2005043092 A | 2/2005 |
| JP | 2005517175 A | 6/2005 |
| JP | 2005526332 A | 9/2005 |
| JP | 2009520205 A | 5/2009 |
| JP | 2009271046 A | 11/2009 |
| JP | 2011253078 A | 12/2011 |
| JP | 2012013715 A | 1/2012 |
| JP | 2012103208 A | 5/2012 |
| JP | 2013-512445 | 4/2013 |
| JP | 2013242179 A | 12/2013 |
| KR | 10-2004-0110071 | 12/2004 |
| WO | WO01006232 A2 | 1/2001 |
| WO | WO 02/084238 A2 | 10/2002 |
| WO | WO 03/067228 A1 | 8/2003 |
| WO | WO03100153 A1 | 12/2003 |
| WO | WO2007078505 A2 | 7/2007 |
| WO | WO 2009/141622 A1 | 11/2009 |
| WO | WO 2011/064403 | 6/2011 |
| WO | WO2012/176851 A | 12/2012 |
| WO | WO 2013/064510 | 5/2013 |
| WO | 2014089120 | 6/2014 |
| WO | 2015015493 | 2/2015 |
| WO | WO2015050464 A | 4/2015 |

OTHER PUBLICATIONS

Extended European Search Report corresponding to EP 16 18 2550, dated Apr. 13, 2017, 15 pages.
Partial European Search Report corresponding to EP 16 18 2550, dated Jan. 2, 2017, 8 pages.
Partial European Search Report corresponding to EP 16182511.2, dated Jan. 3, 2017, 7 pages.
Xin et al., "A vectored water jet propulsion method for autonomous underwater vehicles", Ocean Engineering, vol. 74, Nov. 2013, 8 pages, XP028778880.
Extended European Search Report corresponding to EP 16 18 2511, dated Apr. 3, 2017, 13 pages.
CLARIOstar, "High Performance Microplate Reader with Advanced LVF MonochromatorsTM", BMG Labtech The Microplate Reader Company, Aug. 2013, 8 pages.
PCT/US2015/0313415 Search Report dated Mar. 30, 2015, 2 pages.

* cited by examiner

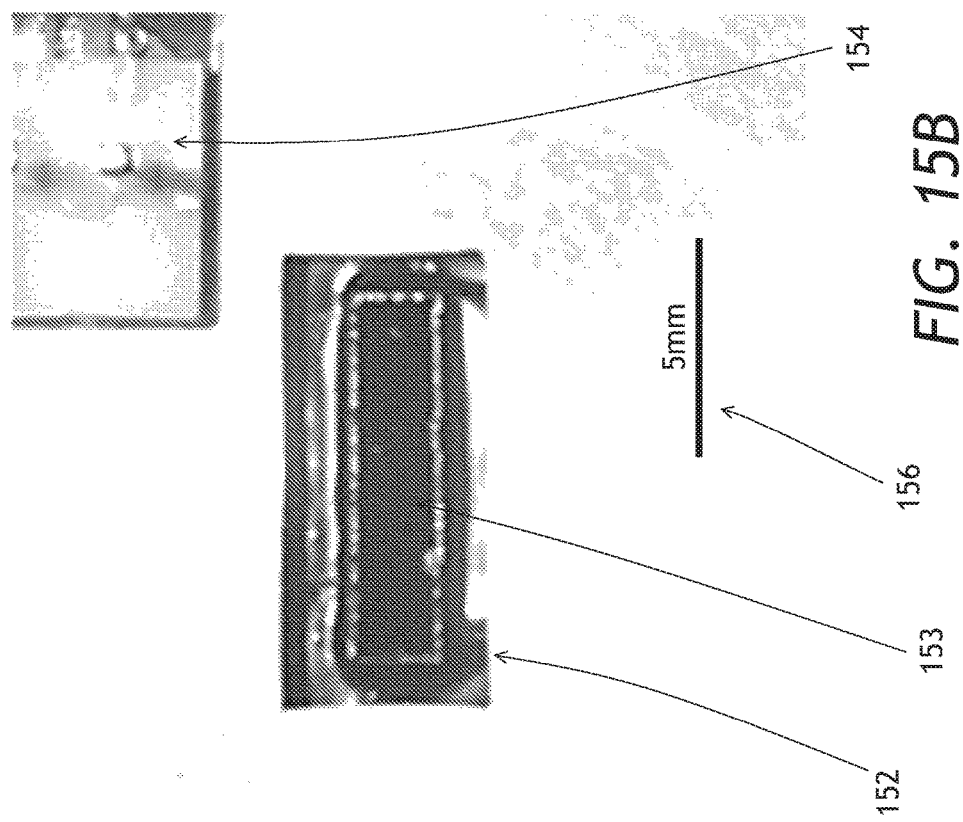
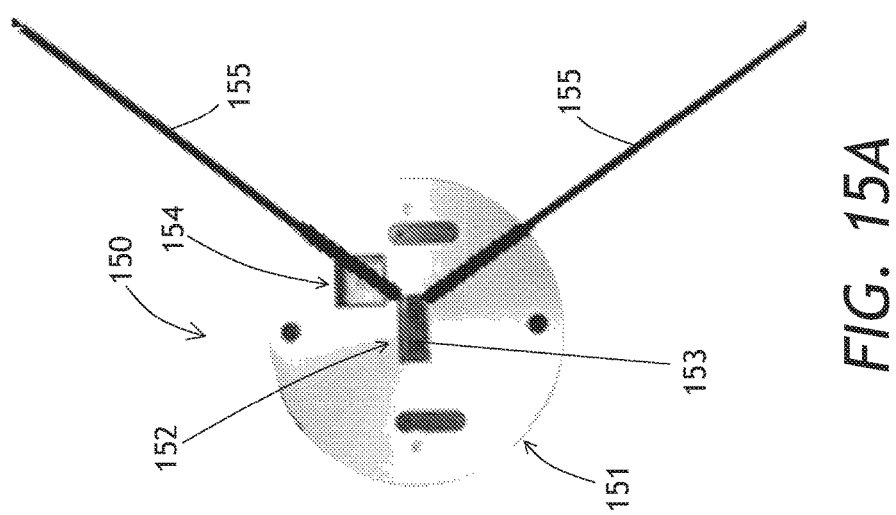
FIG. 15B
FIG. 15A

OPTICAL FILTER AND SPECTROMETER

CROSS-REFERENCE TO RELATED APPLICATIONS

This application is a continuation of U.S. patent application Ser. No. 14/608,356, filed Jan. 29, 2015 (now U.S. Pat. No. 9,625,628), which claims priority from U.S. Provisional Application No. 61/934,547 filed Jan. 31, 2014, which are incorporated herein by reference.

TECHNICAL FIELD

The present disclosure relates to optical components, and in particular to optical filters and spectrometers.

BACKGROUND

An optical filter is used to select a spectral band or a spectral component of incoming light. A high pass filter, for example, selects light at wavelengths longer than an edge wavelength of the filter. Conversely a low pass filter selects light at wavelengths shorter than an edge wavelength. A bandpass filter is a distinct type of filter, which selects light at wavelengths proximate to a center wavelength of the filter within a bandwidth of the filter. A tunable bandpass filter is an optical filter, the center wavelength of which may be adjusted or tuned.

A spectrometer measures an optical spectrum of incoming light. A scanning-type spectrometer may use one or more tunable bandpass filters to select different spectral components of the incoming light. A scanning-type spectrometer operates by scanning the center wavelength of the tunable bandpass filter, so as to obtain the optical spectrum. Alternatively, a polychromator-type spectrometer uses a wavelength-dispersing element optically coupled to a detector array for parallel detection of the optical spectrum. However, conventional optical filters and spectrometers are typically large and bulky, making it a challenge to use them in portable devices and applications.

In view of the foregoing, it may be understood that there may be significant problems and shortcomings associated with current solutions and technologies for optical filters and spectrometers.

SUMMARY

In accordance with the present disclosure, two or more laterally variable bandpass filters may be stacked at a fixed distance from each other to reduce requirements for impinging beam collimation, or even to completely alleviate the need of a tapered light pipe or another light collimating element. When two laterally variable bandpass filters are stacked together, the upstream filter may function as a spatial filter for the downstream filter. This happens because an oblique beam transmitted by the upstream filter is displaced laterally when impinging on the downstream filter. The lateral displacement may result in suppression of the oblique beam, because transmission wavelengths of the upstream and downstream filters may not overlap when beam impinging locations on the upstream and downstream filters do not overlap, resulting in suppression of oblique beams. Due to this effect, a dependence of spectral selectivity of the optical filter on a degree of collimation of the incoming beam striking the upstream filter may be lessened.

In accordance with an aspect of the disclosure, there is provided an optical filter comprising an upstream laterally variable bandpass optical filter and a downstream laterally variable bandpass optical filter. The downstream laterally variable bandpass optical filter is sequentially disposed downstream of the upstream variable bandpass optical filter and separated by a distance L along an optical path of an optical beam. The upstream and downstream laterally variable bandpass optical filters each have a bandpass center wavelength that gradually varies in a mutually coordinated fashion along a common first direction transversal to the optical path. A dependence of spectral selectivity of the optical filter on a degree of collimation of the optical beam is less than a corresponding dependence of spectral selectivity of the downstream laterally variable bandpass optical filter on the degree of collimation of the optical beam.

In one exemplary embodiment, the center wavelengths of the upstream and downstream filters are monotonically e.g. linearly or non-linearly increasing in the first direction. The center wavelengths of the upstream and downstream filters may, but do not have to, have a substantially identical dependence of the bandpass center wavelength on an x-coordinate along the first direction.

In accordance with the disclosure, there is further provided an optical spectrometer comprising the above optical filter and an optical sensor disposed in the optical path downstream of the downstream laterally variable bandpass optical filter. The optical sensor may include a photodetector array. The downstream laterally variable bandpass optical filter may be in contact with the photodetector array, for a better spectral selectivity.

In accordance with another aspect of the disclosure, there is further provided a method for obtaining a spectrum of an optical beam propagating along an optical path, the method comprising: filtering the optical beam with an optical filter comprising an upstream laterally variable bandpass optical filter and downstream laterally variable bandpass optical filter, wherein the downstream laterally variable bandpass optical filter is sequentially disposed downstream of the upstream variable bandpass optical filter and separated by a distance L along an optical path of an optical beam, wherein the upstream and downstream laterally variable bandpass optical filters each have a bandpass center wavelength that gradually varies in a mutually coordinated fashion along a common first direction transversal to the optical path, and wherein a dependence of spectral selectivity of the optical filter on a degree of collimation of the optical beam is less than a corresponding dependence of spectral selectivity of the downstream laterally variable bandpass optical filter on the degree of collimation of the optical beam; and detecting optical power distribution along the first direction downstream of the downstream filter.

BRIEF DESCRIPTION OF THE DRAWINGS

Exemplary embodiments will now be described in conjunction with the drawings, in which:

FIGS. 15A and 15B illustrate a plan view (FIG. 15B) of a spectrometer of FIG. 6A;

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
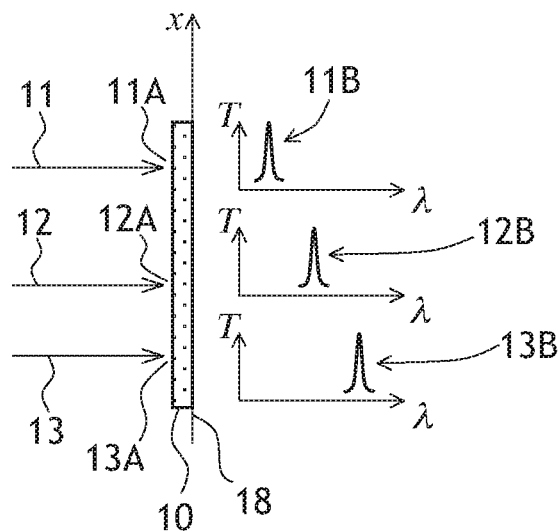
FIG. 1A illustrates a conventional linearly variable filter.

As discussed above, conventional optical filters and spectrometers are large and bulky, which limits their applicability in portable light-sensing devices and applications. Linearly variable filters have been used in spectrometers to provide wavelength separating function. Referring to FIG. 1A, a conventional linearly variable filter 10 may be illuminated with white light, which includes top 11, middle 12, and bottom 13 white light beams. The top 11, middle 12, and bottom 13 light beams may strike the linearly variable filter 10 at respective top 11A, middle 12A, and bottom 13A locations. The linearly variable filter 10 may have a center wavelength of a passband varying linearly along an x-axis 18. For instance, the filter 10 may pass a short wavelength peak 11B at the top location 11A; a middle wavelength peak 12B at the middle location 12A; and a long wavelength peak 13B at the bottom location 13A.

Figure 1B:
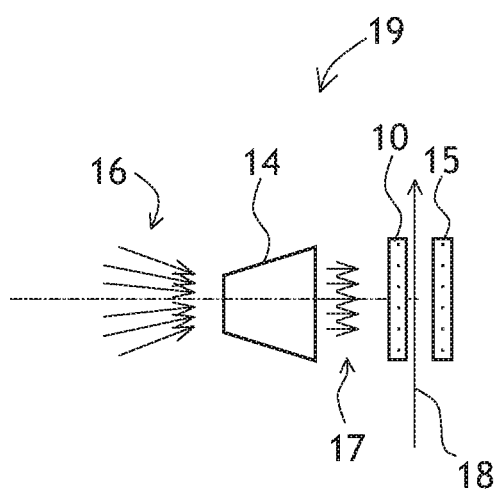
FIG. 1B illustrates a conventional optical spectrometer based on the linearly variable filter of FIG. 1A.

Referring to FIG. 1B with further reference to FIG. 1A, a conventional spectrometer 19 may include the linearly variable filter 10, a tapered light pipe 14 disposed upstream of the linearly variable filter 10, and a linear array 15 of photodetectors disposed downstream of the linearly variable filter 10. In operation, non-collimated incoming light 16 may be conditioned by the light pipe 14 to produce a partially collimated light beam 17. The linearly variable filter 10 may transmit light at different wavelengths as explained above with reference to FIG. 1A. The tapered light pipe 14 may reduce a solid angle of the incoming light 16, thereby improving spectral selectivity of the linearly variable filter 10. The linear array 15 of photodetectors may detect optical power levels of light at different wavelengths, thereby obtaining an optical spectrum, not shown, of the incoming light 16.

It may therefore be desirable to reduce the size of the spectrometer 19. The tapered light pipe 14 may often be the largest element of the spectrometer 19. A collimating element, such as tapered light pipe 14, may be needed because without it, the spectral selectivity of the linearly variable filter is degraded. This may happen because the linearly variable filter 10 includes a stack of thin dielectric films. The wavelength-selective properties of thin film filters may be generally dependent on the angle of incidence of incoming light, which may deteriorate spectral selectivity and wavelength accuracy of thin film filters.

Figure 2A:
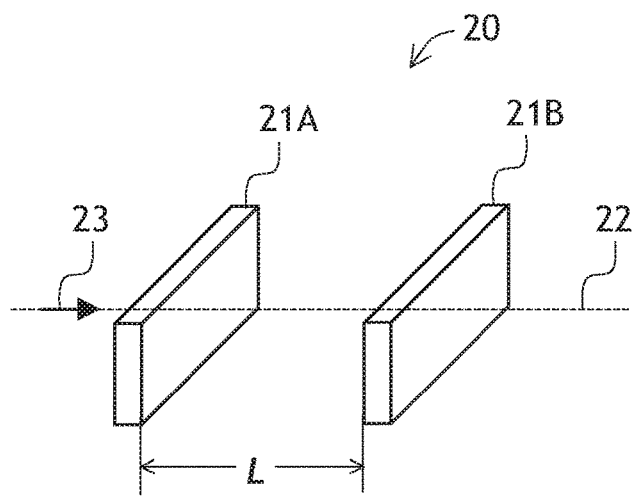
FIG. 2A illustrates an optical filter according to the present disclosure, including a pair of laterally variable bandpass filters.
Figure 2B:
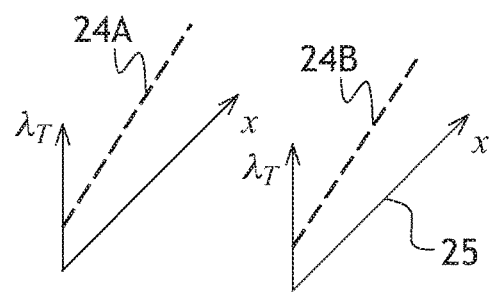
FIG. 2B illustrates center wavelength dependences of the laterally variable bandpass filters of FIG. 2A.

Referring to FIGS. 2A and 2B, an optical filter 20 (FIG. 2A) may be provided as described below. For example, the optical filter 20 may include sequentially disposed upstream 21A and downstream 21B laterally variable bandpass optical filters separated by a distance L in an optical path 22 of an optical beam 23. As shown in FIG. 2B, the upstream 21A and downstream 21B filters each may have a bandpass center wavelength $\lambda_T$ varying in a mutually coordinated fashion along a common first direction 25 represented by the x-axes. The first direction 25 may be transverse to the optical path 22. By way of a non-limiting example, the bandpass center wavelength $\lambda_T$ of both the upstream 21A and downstream 21B filters of FIG. 2A may have respective monotonic, linear dependences 24A, 24B, as shown in FIG. 2B. The center wavelength dependences $\lambda_{1T}(x)$ and $\lambda_{2T}(x)$ of the upstream 21A and downstream 21B filters, respectively, on the x-coordinate may be identical, or shifted with respect to each other e.g. $\lambda_{2T}(x)=\lambda_{1T}(x+x_0)$, where is a constant; or scaled e.g. $\lambda_{2T}(x)=c\lambda_{1T}(x)$, where c is a constant e.g. 0.9<c<1.1. In other words, the term "coordinated fashion" defines a pre-determined functional relationship between the center wavelength dependences $\lambda_{1T}(x)$ and $\lambda_{2T}(x)$ of the upstream 21A and downstream 21B filters, respectively.

Figure 2C:
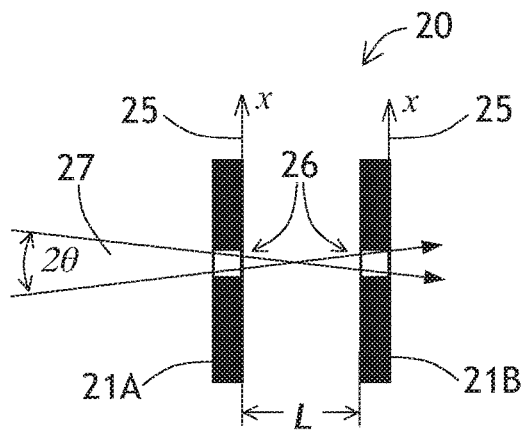
FIG. 2C is a side schematic view of the optical filter of FIG. 2A illustrating a principle of spatial filtering by the optical filter.

The configuration of the optical filter 20 may enable a dependence of spectral selectivity of the optical filter 20 on a degree of collimation of the optical beam 23 to be lessened as compared to a corresponding dependence of spectral selectivity of the downstream filter 21B on the degree of collimation of the optical beam 23. This performance improvement of the optical filter 20 may result from a spatial filtering effect, which may be understood by referring to FIG. 2C. In monochromatic light at a wavelength $\lambda_0$, the upstream 21A and downstream 21B filters may be approximately represented by slits having "openings" 26 corresponding to locations along the x-axes where the center wavelength $\lambda_T=\lambda_0$. In other words, outside of the "openings" 26, the upstream 21A and downstream 21B filters may be essentially opaque for the monochromatic light at the wavelength $\lambda_0$. The "openings" 26 define an acceptance cone, or solid angle 27 (2θ), which depends on the inter-filter distance L. Any rays outside of the solid angle 27 may be blocked, thus improving the spectral selectivity of the downstream filter 21B.

Figure 3:
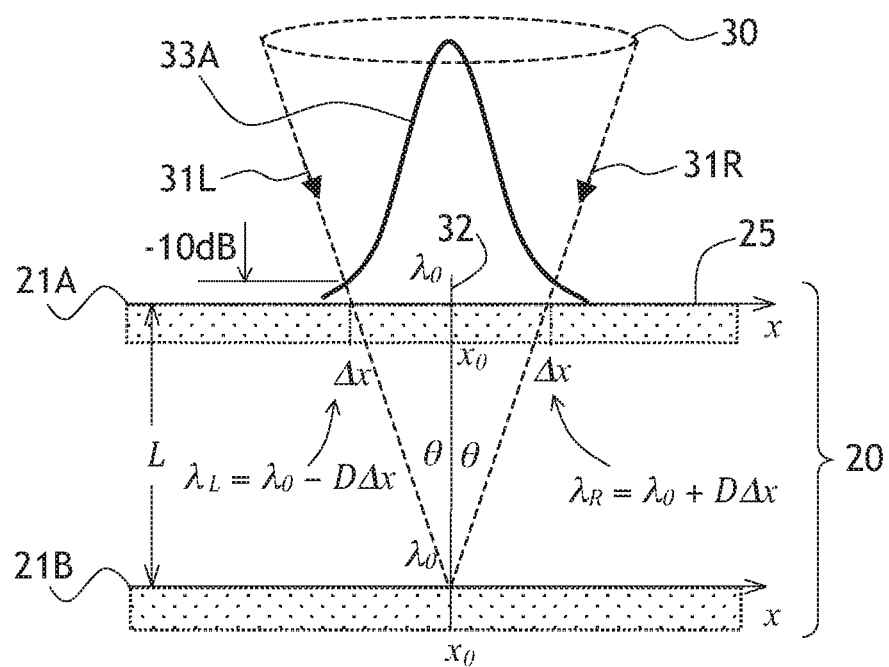
FIG. 3 illustrates an optical filter of FIG. 2A in a side cross-sectional view showing an acceptance angle of the optical filter.

The operation of the optical filter 20 of FIG. 2A may be further explained by referring to FIG. 3 showing the optical filter 20 in a side cross-sectional view. In FIG. 3, the first direction 25 may be horizontal, and the center wavelength $\lambda_T$ may increase from left to right, for both the upstream 21A and downstream 21B optical filters. In the example of FIG. 3, the bandpass center wavelengths $\lambda_T$ of the upstream 21A and downstream 21B filters may be linearly dependent on the x-coordinate:

$$\lambda_T=\lambda_0+D\Delta x \quad (1)$$

where $\lambda_0$ represents a reference bandpass center wavelength at a reference point $x_0$, D represents the proportionality coefficient, termed the "slope" of a laterally variable filter, and $\Delta x$ represents an offset from the reference point $x_0$. The slope D may correspond to the slopes of the linear dependences 24A and 24B in FIG. 2B, which may, but does not have to, be identical to each other. Deviations from identical slope of the linear dependences 24A and 24B may be advantageous in some applications.

In the example of FIG. 3, the upstream 21A and downstream 21B filters may be aligned with each other, so that the reference point $x_0$ corresponding to the reference bandpass center wavelength $\lambda_0$ of the downstream filter 21B is disposed directly under the reference point $x_0$ corresponding to the reference bandpass center wavelength $\lambda_0$ of the upstream filter 21A. The upstream filter 21A may function as a spatial filter for the downstream filter 21B, defining an angle of acceptance 30 for the downstream filter 21B. The angle of acceptance 30 may be limited by left 31L and right 31R marginal rays at the reference wavelength $\lambda_0$, each propagating at the angle θ to a normal 32 to the upstream 21A and downstream 21B filters and striking downstream filter 21B at the same reference point $x_0$. The angle of acceptance 30 may be derived from a passband 33A of the upstream filter 21A as follows.

In the geometry illustrated in FIG. 3, the left marginal ray 31L may strike the upstream filter 21A at a location $x_0-\Delta x$. Transmission wavelength $\lambda_L$ sat that location may be, according to Eq. (1), $\lambda_L=\lambda_0-D\Delta x$. Since the left marginal ray 31L is at the reference wavelength $\lambda_0$, the left marginal ray 31L may be attenuated depending on the width of the passband 33A of the upstream filter 21A; for sake of this example, e.g. a 10 dB bandwidth is taken to be 2$D\Delta x$. Thus, the left marginal my 31L may be attenuated by 10 dB. Similarly, the right marginal my 31R may strike the upstream filter 21A at a location $x_0+\Delta x$. Transmission wavelength $\lambda_R$ at that location may be, according to Eq. (1), $\lambda_R=\lambda_0+D\Delta x$. The right marginal ray 31R may also be attenuated by 10 dB. All rays at the reference wavelength $\lambda_0$ within the acceptance angle 30 may be attenuated by a value smaller than 10 dB; and all rays at the reference wavelength $\lambda_0$ outside the acceptance angle 30 may be attenuated by a value larger than 10 dB. In other words, the upstream filter 21A may function as spatial filter, effectively limiting the numerical aperture (NA) of incoming light to be separated in individual wavelengths by the downstream filter 21B. This may result in reduction of the dependence of spectral selectivity of the optical filter 20 in comparison with the corresponding dependence of the spectral selectivity of the single downstream filter 21B on the degree of collimation of the optical beam 23. In other words, if the upstream filter 21A were absent in the optical filter 20, the spectral selectivity of the optical filter 20 would be much more dependent on the degree of collimation of the optical beam 23. Typically, the optical beam 23 may result from scattering or luminescence of a sample, not shown, so that the optical beam 23 is not collimated. The lack of collimation of the optical beam 23 in the absence of the upstream filter 21A would result in worsening of overall spectral selectivity unless a dedicated collimating element, such as a tapered light pipe, is used. Herein, the term "spectral selectivity" may include such parameters as passband width, stray light rejection, in-band and out-of-band blocking, etc.

For small angles θ, one may write $$\theta \approx \Delta x/L \quad (2), or$$

$$L \approx \Delta x/\theta \quad (3)$$

When the space between the upstream 21A and downstream 21B filters is filled with a transparent medium having a refractive index n, Eq. (3) becomes $$L/n \approx \Delta x/\theta \quad (4)$$

Eq. (4) may define an approximate relationship between the inter-filter distance L, the refractive index n of the inter-filter gap, a lateral distance $\Delta x$ along the first direction 25, related to a bandwidth of the upstream filter 21A, and the resulting acceptance half-angle θ A more precise relationship may take into account the wavelength offset due to non-zero angle of incidence, which typically results in a blue shift (i.e. towards shorter wavelength) of the bandpass center wavelength $\lambda_T$. For instance, the right marginal ray 31R at the reference wavelength $\lambda_0$ striking the upstream filter 21A at the position $x_0+\Delta x$ may be tilted by the angle θ, which shifts the transmission characteristic of the upstream filter 21A to shorter wavelengths. If this wavelength dependence is to be accounted for, the shoulders of the passband 33A may shift to the left i.e. shorter wavelengths:

$$\lambda_1 \approx [(\lambda_0+D\Delta x)(n_{\mathit{eff}}^2-\theta^2)^{1/2}]/n_{\mathit{eff}} \quad (5)$$

where $n_{\mathit{eff}}$ represents an effective refractive index of the upstream filter 21A.

Although in FIG. 2B, the upstream 21A and downstream 21B laterally variable bandpass filters have linearly variable bandpass center wavelengths $\lambda_T$ as defined by Eq. (1) above, the center wavelengths $\lambda_T$ of the upstream 21A and downstream 21B filters may be monotonically non-linearly, e.g. parabolically or exponentially, increasing or decreasing in the first direction 25. The dependence of the bandpass center wavelength $\lambda_T$ on the x-coordinate along the first direction 25 of the upstream 21A and downstream 21B laterally variable filters may be identical, or may be different to enable tweaking or varying of the acceptance angle and/or wavelength response of the optical filter 20. In one embodiment, the bandpass center wavelengths $\lambda_T$ of the upstream 21A and downstream 21B filters may be aligned with each other, such that a line connecting positions corresponding to a same bandpass center wavelength $\lambda_T$ of the upstream 21A and downstream 21B filters forms an angle of less than 45 degrees with the normal 32 to the downstream filter 21B. For non-zero angles with the normal 32, the acceptance cone 30 may appear tilted. Thus, it may be possible to vary the acceptance cone 30 direction by offsetting the upstream 21A and downstream 21B filters relative to each other in the first direction 25. Furthermore, the angle may vary along the first direction (x-axis) 25.

For a better overall throughput, it may be preferable to have a lateral distance $\Delta x_1$ along the first direction 25, corresponding to a bandwidth of the upstream filter 21A larger than a corresponding lateral distance $\Delta x_2$ along the first direction 25, corresponding to a bandwidth of the downstream filter 21B. In one embodiment, the upstream 21A and downstream 21B filters each may have a 3 dB passband no greater than 10% of a corresponding bandpass center wavelength $\lambda_T$.

The upstream 21A and/or downstream 21B filters may include a thin film layer stack including two, three, and more different materials, e.g., high-index and/or absorbing layers may be used to reduce overall thickness of each of the upstream 21A and downstream 21B filters. Furthermore, the upstream 21A and/or the downstream 21B filters may include diffraction gratings e.g. sub-wavelength gratings, dichroic polymers, etc.

Figure 4A:
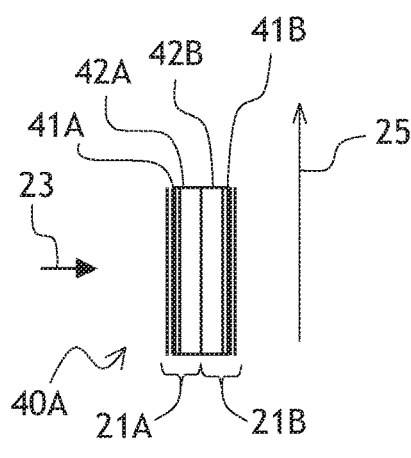
FIGS. 4A to 4E illustrate schematic side views of various embodiments of optical filters of FIGS. 2A and 3.
Figure 4B:
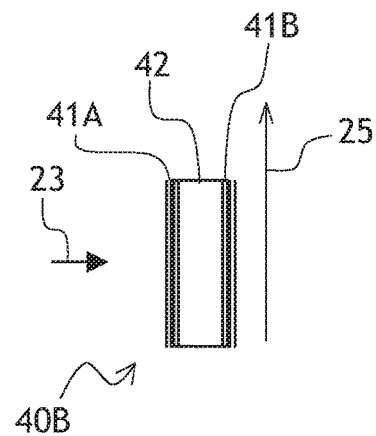
Figure 4C:
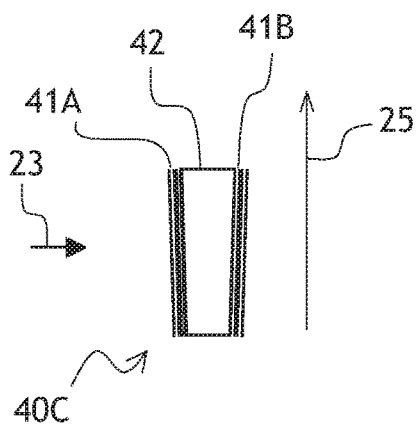

Referring to FIG. 4A, the upstream 21A and downstream 21B filters of an optical filter 40A may include thin film wedged interference coatings 41A and 41B, deposited on respective substrates 42A and 42B joined back-to-back. The substrates 42A and 42B may function as a transparent medium having a refractive index n between the upstream 41A and downstream 41B thin film wedged interference coatings. Turning to FIG. 4B, a single common substrate 42 may be used in an optical filter 40B, the upstream 41A and downstream 41B thin film wedged interference coatings being disposed on opposite sides of the common substrate 42. The common substrate 42 may be wedged as shown in FIG. 4C, so that the upstream 41A and downstream 41B thin film wedged interference coatings (filters) of an optical filter 40C are disposed at an angle to each other. In this case, the distance L may vary along the first direction 25. The distance L variation may help one to manage spectral slope mismatch between the upstream 41A and downstream 41B filters, as well as spectral linewidth difference between the upstream 41A and downstream 41B filters. To that end, the refractive index n may also vary along the first direction 25, at the distance L constant or varying.

Figure 4D:
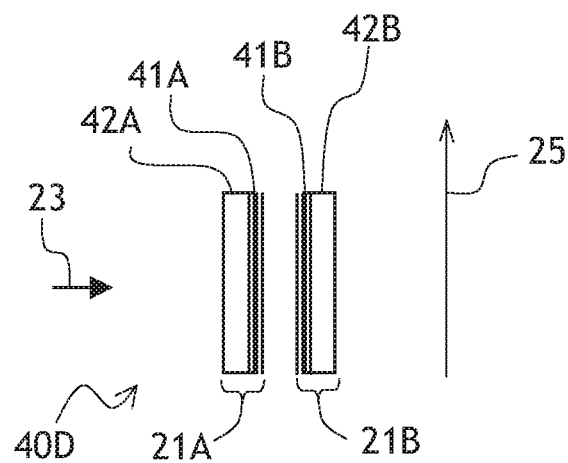
Figure 4E:
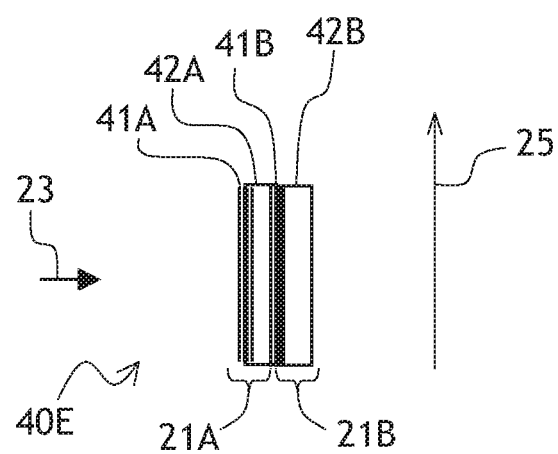

FIG. 4D illustrates another configuration of an optical filter 40D, in which the upstream 41A and downstream 41B thin film wedged interference coatings may be facing each other, being disposed in a spaced apart relationship. An optical filter 40E of FIG. 4E illustrates another embodiment including thin film wedged interference coatings 41A and 41B both facing a same direction, e.g., the optical beam 23 in this case.

Referring back to Eq. (4) with further reference to FIGS. 2A and 4A to 4C, the value L/n may typically be greater than 0.2 mm. In one embodiment, the value L/n may be less than 15 mm, e.g., between 0.2 mm and 15 mm. It should be appreciated that the distance L may correspond to a distance between the actual thin film coatings, e.g., 41A and 41B in FIGS. 4A to 4C, and may include thicknesses of the substrates 42, 42A, and/or 42B, should these substrates be in the optical path 22 between the thin film coatings 41A and 41B. By way of a non-limiting illustration, in the optical filter 40B of FIG. 4B, L may represent the thickness of the substrate 42, and a may represent the refractive index of the substrate 42.

Figures 5A, 5B:
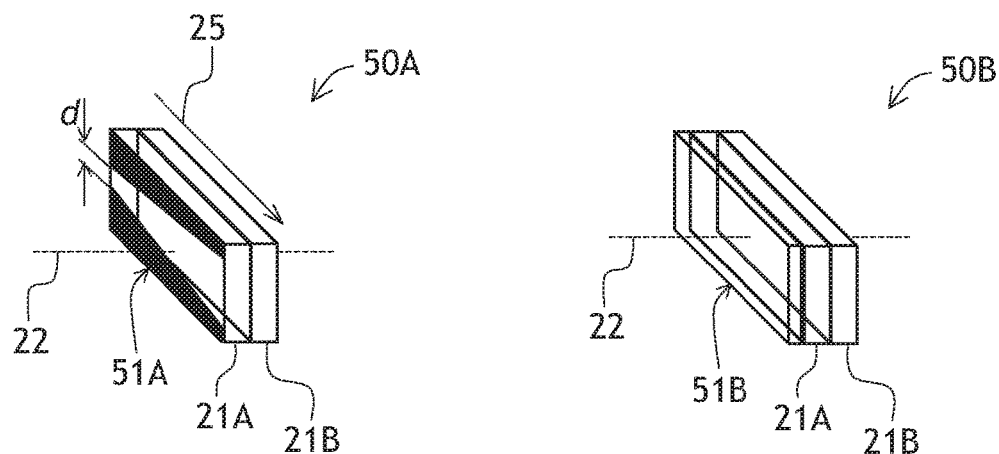
FIGS. 5A to 5C illustrates three-dimensional views of various embodiments of optical filters of the present disclosure.

Referring now to FIG. 5A, optical filter 50A may be similar to the optical filter 20 of FIG. 2A, and may be similar to the optical filters 40A to 40E of FIGS. 4A to 4E. The optical filter 50A of FIG. 5A, however, may further include an aperture 51A disposed in the optical path 22. The aperture 51A may have a width d varying in the first direction 25. One function of the varying width d of the aperture 51A may be to adjust the amount of optical energy impinging on the optical filter 50A, which may be used to compensate for a wavelength dependence of a magnitude of output transmission of the upstream 21A/downstream 21B filters, and/or a spectral response of a photodetector array (not shown).

A compensating filter may be employed for a more precise control of the filter's spectral response and/or a spectral response of a photodetector, not shown. Referring to FIG. 5B, optical filter 50B may be similar to the optical filter 20 of FIG. 2A, and may be similar to the optical filters 40A to 40E of FIGS. 4A to 4E. A spectral response flattening filter SIB may be disposed in the optical path 22 of the optical filter 50B for flattening a spectral response of the optical filter 50B. Although the spectral flattening filter 50B is shown in FIG. 5B to be disposed on the upstream filter 21A, the spectral flattening filter 50B may be disposed on the downstream filter 21B and/or in the optical path 22 between the upstream 21A and downstream 21B filters.

Figure 5C:
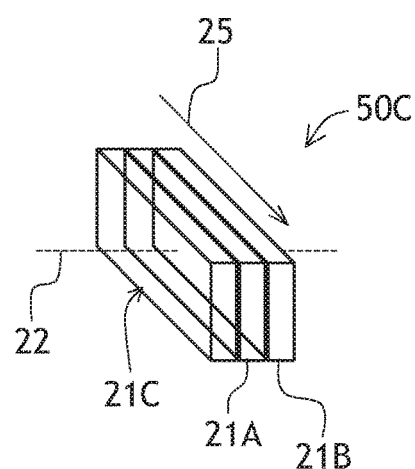

Turning now to FIG. 5C, optical filter SOC may be similar to the optical filter 20 of FIG. 2A, and may be similar to the optical filters 40A to 40E of FIGS. 4A to 4E. The optical filter 50C of FIG. 5C, however, may further include an additional filter 21C in the optical path 22. The additional filter 21C may have a bandpass center wavelength varying in a coordinated fashion with the bandpass center wavelengths of the upstream 21A and downstream 21B filters. The additional filter 21C may also include a high pass or a low pass laterally variable filter, a dispersive element such as a diffraction grating, a coating with spectrally and/or laterally variable absorption, etc. The function of the additional filter 21C may be to further define input numerical aperture of incoming light, and/or further improve the resolving power of the optical filter 20. More than three laterally variable bandpass filters 21A, 21B, . . . 21N, where N represents any integer, may be used in the optical filter 50C.

Figure 6A:
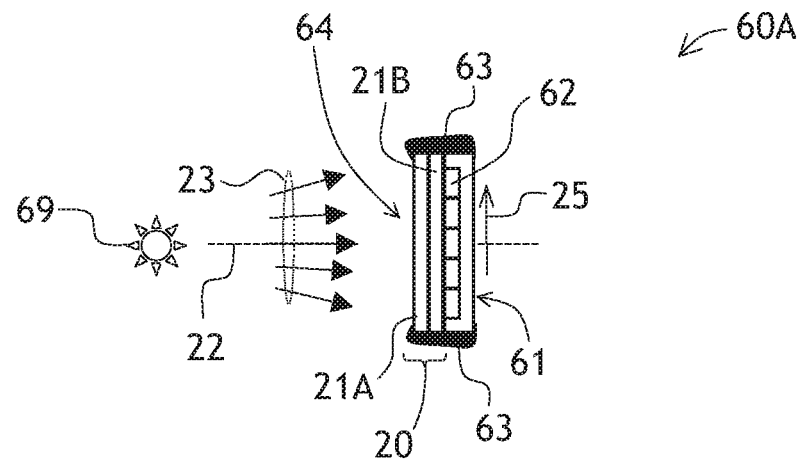
FIG. 6A illustrates schematic cross-sectional side view of a spectrometer including optical filters of FIG. 2A, 3, 4A to 4E, or 5A to 5C and a photodetector array.

Referring to FIG. 6A with further reference to FIG. 2A, an optical spectrometer 60A (FIG. 6A) may include the optical filter 20 of FIG. 2A and a photodetector array 61 disposed in the optical path 22 downstream of the downstream filter 21B. The photodetector array 61 may have pixels 62 disposed along the first direction 25 for detecting optical power levels of individual spectral components of the optical beam 23, e.g., emitted by a light source 69. In a broad sense, the term "light source" may refer to a fluorescent or scattering sample, an actual light source, e.g., for absorption measurements, etc. The light beam 23 originating, e.g., from a luminescent and/or scattering sample, may generally include converging or diverging rays. Herein, the term "diverging" may not require that the rays comprising the optical beam 23 originate from a same single point. Similarly, the term "converging" may not require the rays comprising the optical beam 23 to converge to a single point. As explained above with reference to FIGS. 2C and 3, the dual-filter structure of the optical filter 20, including the upstream 21A and downstream 21B bandpass laterally variable optical filters, may result in lessening of the dependence of spectral selectivity of the optical spectrometer 60A on a degree of collimation of the optical beam 23. In other words, if only the downstream filter 21B were used, without the upstream filter 21A, the spectral selectivity of the optical spectrometer may be much more dependent on the degree of collimation of the optical beam 23, resulting in an overall worsening of the spectral selectivity.

The photodetector array 61 may be in direct contact with the downstream filter 21B. The photodetector array 61 may be flooded with a potting material so as to form an encapsulation 63. One function of the encapsulation 63 may be to provide an electronic and/or thermal insulation of the photodetector array 61, while not obscuring a clear aperture 64 of the downstream filter 21B of the optical filter 20. Another function of the encapsulation 63 may be to protect edges of the upstream 21A and downstream 21B filters from impact, moisture, etc.

Figure 6B:
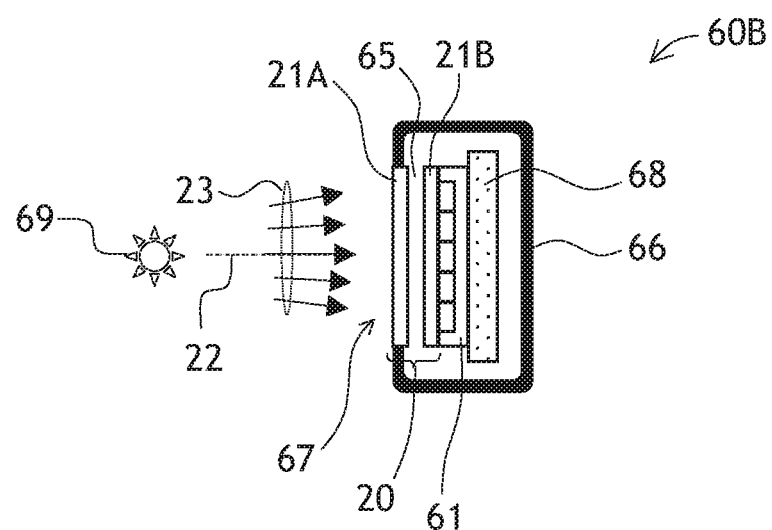
FIG. 6B illustrates schematic cross-sectional side view of a sealed spectrometer including optical filters of FIG. 2A, 3, 4D, or 5A to 5C.

Referring to FIG. 6B with further reference to FIGS. 2A and 6A, an optical spectrometer 60B (FIG. 6B) may include the optical filter 20 of FIG. 2A and the photodetector array 61 disposed in the optical path 22 downstream of the downstream filter 21B. The optical spectrometer 60B may further include an enclosure 66 having a window 67 disposed in the optical path 22 for inputting the optical beam 23. In the embodiment shown, the window 67 may include the upstream filter 21A, and the upstream 21A and downstream 21B filters are separated by a gap 65 e.g. air gap. The downstream filter 21B may be mounted directly on the photodetector array 61. In one embodiment, a small gap, e.g., less than 2 mm, may be present between the downstream filter 21B and the photodetector array 61.

The gap 65 may allow the photodetector array 61 to be thermally decoupled from the enclosure 66, which in its turn enables deep cooling of the photodetector array 61 by an optional thermoelectric cooler 68. The enclosure 66 may be hermetically sealed and/or filled with an inert gas for better reliability and environmental stability. A focusing element, not shown, may be provided in the optical path 22 between the downstream filter 21B and the photodetector array 61 for focusing the optical beam 23 on the photodetector array 61. A sensor other than the photodetector array 61 may be used. By way of a non-limiting example, a photodetector may be translated relative to the optical filter 20 in the first direction 25.

Figure 7A:
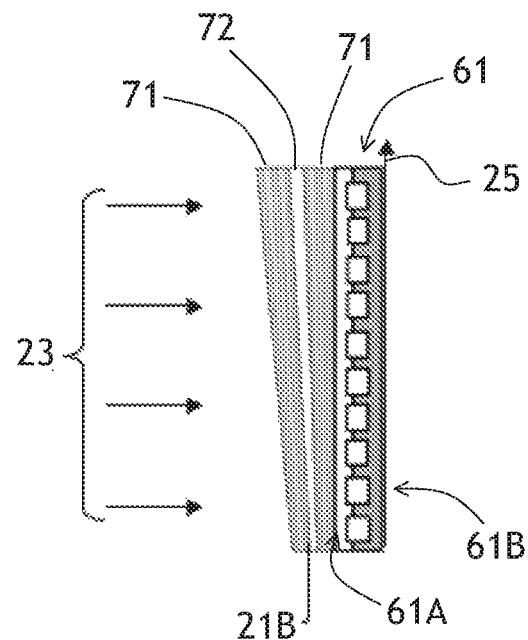
FIGS. 7A to 7D illustrate partial cross-sectional side views of various embodiments of the spectrometer of FIG. 6A showing mounting configurations of the downstream filter on the photodetector array.

Mounting options of the downstream filter 21B may include depositing the thin film structure of the downstream filter 21B directly on the photodetector array 61. By way of a non-limiting example, in FIGS. 7A and 7B, the downstream filter 21B may be deposited on a pixel side 61A of the photodetector array 61. In some embodiments, the downstream filter 21B may be a wedged thin film filter, including two blocking filter sections 71 and a bandpass filter section 72 between the two blocking filter sections 71.

Figure 7B:
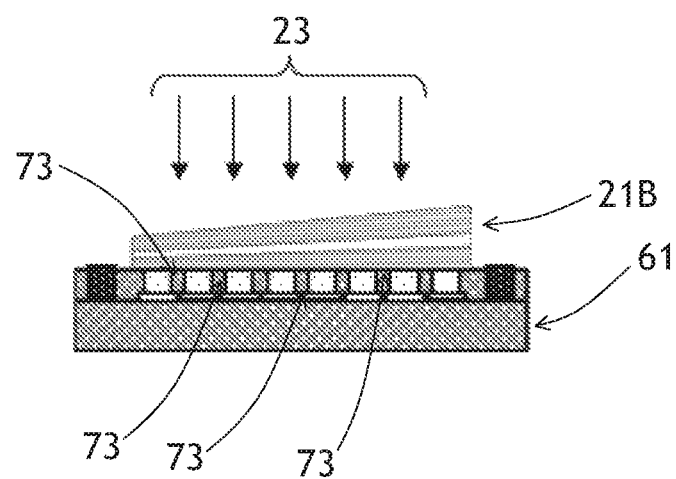
Figure 7C:
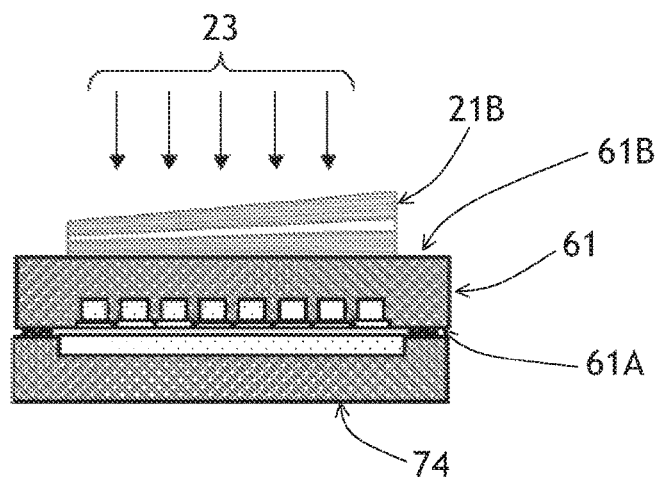
Figure 7D:
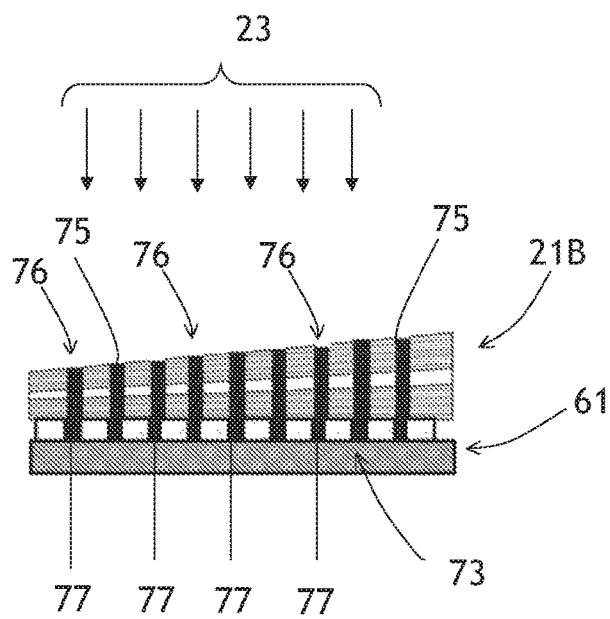

In FIG. 7B specifically, a light-absorbing mask 73 may be placed between the individual pixels 62, to shield the individual pixels 62 from stray light. In FIG. 7C, an alternative mounting option is illustrated: the downstream filter 21B may be disposed on a back side 61B of the photodetector array 61. Of course, this mounting option may require that a substrate 61C of the photodetector array 61 be transparent to the optical beam 23. Advantageously, the back-mounting may allow a driver circuitry chip 74 to be flip-chip bonded to the pixel side 61A of the photodetector array 61. Turning to FIG. 7D, the downstream filter 21B may be segmented by providing, e.g., etching a plurality of parallel grooves 76, with a black filling material 75 poured into the grooves 76, the position of which may be coordinated with bars 77 of the light-absorbing mask 73.

Figure 8A:
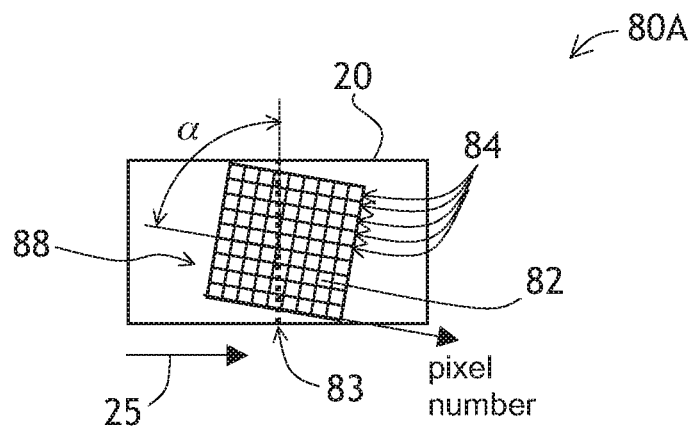
FIG. 8A illustrates a plan view of a spectrometer embodiment having a tilted two-dimensional (2D) detector array.
Figure 8B:
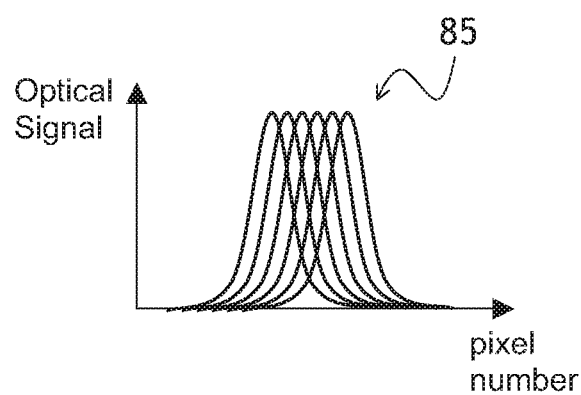
FIG. 8B illustrates optical power density distribution on different rows of pixels of the 2D detector array of FIG. 8A.

Referring to FIG. 8A with further reference to FIGS. 6A and 6B, a spectrometer 80A is shown in a partial plan view. The spectrometer 80A may be similar to the spectrometers 60A of FIGS. 6A and 60B of FIG. 6B. The spectrometer 80A of FIG. 8A, however, may include a two-dimensional (2D) photodetector array 88 having a plurality of individual photodetector pixels 82. The 2D photodetector array 88 may be rotated, or clocked, by an acute angle $\alpha$ relative to rows 84 of the pixels 82 of the optical filter 20, so that upon a monochromatic illumination, a spectral line 83 is formed on the photodetector array 31 at the angle $\alpha$ to the rows 84 of the pixels 82 of the 2D photodetector array 88. Referring to FIG. 8B with further reference to FIG. 8A, the rotation or clocking by the angle $\alpha$ may cause optical power density distributions 85 on different rows 84 of pixels 82 of the 2D photodetector array 88 to be offset from each other. In this manner, instead of one spectrum, a plurality of offset spectra may be obtained, enabling a spectral resolution and wavelength accuracy increase. A signal to noise ratio may also be improved, e.g., by de-convoluting and averaging individual optical power density distributions 85.

Figure 8C:
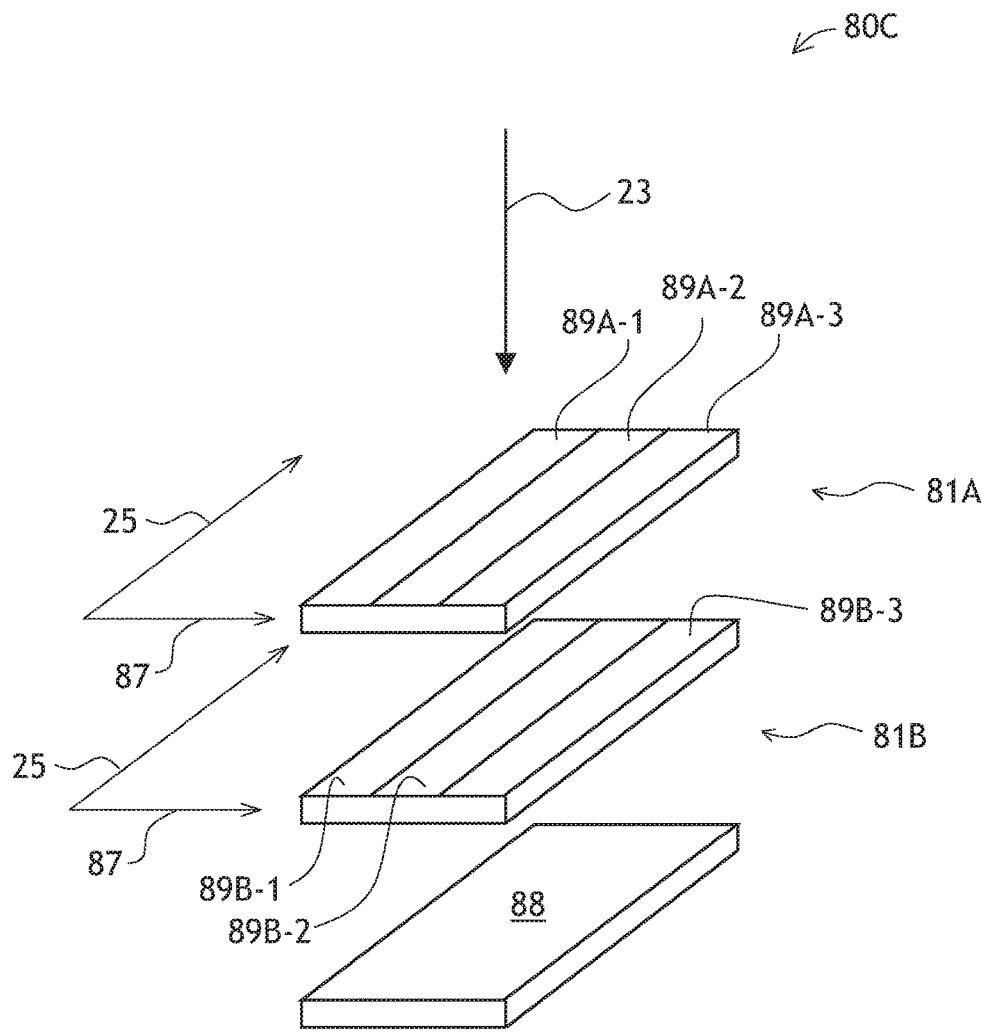
FIG. 8C illustrates an exploded view of a multi-spectral spectrometer embodiment of the present disclosure.

Turning now to FIG. 8C, a spectrometer 80C may be a variant of the spectrometer 80A of FIG. 8A. The spectrometer 80C of FIG. 8C may also include the 2D photodetector array 88. In FIG. 8C, the 2D photodetector array 88 may or may not be tilted as shown in FIG. 8A. The spectrometer 80C of FIG. 5C may further include upstream 81A and downstream 81B filters similar to the corresponding upstream 21A and downstream 21B filters of the optical filter 20 of FIG. 2A, that is, having bandpass center wavelengths gradually varying in a mutually coordinated fashion along the first direction 25 transversal to the optical path 22 of the optical beam 23. In FIG. 8C, the upstream 81A and downstream 81B filters each may include a plurality of segments 89A-1, 89A-2, 89A-3 (the upstream filter 81A) . . . and 89B-1, 891-2, 891-3 (the downstream filter 81B) arranged side by side in a second direction 87 perpendicular to the first direction 25. Each segment 89A-1, 89A-2, 89A-3 . . . of the upstream filter 81A corresponds to one of the segments 89B-1, 89B-2, 89B-3 of the downstream filter 81B for operation in a dedicated wavelength region. By way of a non-limiting example, the first pair of segments 89A-1 and 89B-1 may be configured for operation in the wavelength range of 1000 nm to 1200 nm, the second pair of segments 89A-2 and 89B-2 may be configured for operation in the wavelength range of 1200 nm to 1400 nm, the third pair of segments 89A-3 and 891-3 may be configured for operation in the wavelength range of 1400 nm to 1600 nm, and so on. The wavelength ranges may not need to be contiguous. For example, multiple segments may be provided for other wavelength regions such as visible wavelengths or near infrared (IR), mid IR, ultraviolet (UV), and even soft X-ray. Thus, the spectrometer 80C may be suitable for multi-spectral sensing and/or multi-spectral imaging applications. These multi spectral sending/imaging applications may require suitable substrate and coating materials, as appreciated by those skilled in the art.

Referring back to FIG. 2A, a method for obtaining a spectrum of the optical beam 23 propagating along the optical path 22 may include filtering the optical beam 23 with optical filter 20 having upstream 21A and downstream 21B laterally variable bandpass optical filters separated by a distance L. As illustrated in FIG. 2B, the upstream 21A and downstream 21B filters each may have a bandpass center wavelength $\lambda_T$ gradually varying in a mutually coordinated fashion (e.g. 24A, 24B) along the common first direction 25 transversal to the optical path 22. Due to the sequential placement of the upstream 21A and downstream 21B filters, a dependence of spectral selectivity of the optical filter, such as bandwidth, out-of-band rejection, etc., on a degree of collimation of the optical beam 23 may be less than a corresponding dependence of spectral selectivity of the downstream filter 21B alone on the degree of collimation of the optical beam 23.

In the next step of the method, the optical power distribution may be detected along the first direction 25 downstream of the downstream filter 21B. For instance, referring back to FIGS. 6A, 6B, and 8A, the photodetector array 61 (FIG. 6A, 6B) or the 2D photodetector array 88 (FIG. 8A) may be disposed downstream of the downstream filter 21B, and the optical power distribution may be detected using the photodetector arrays 61 or 88. Referring again to FIGS. 6A and 7A to 7C, the downstream filter 21B may be disposed, e.g. deposited, directly on the photodetector array 61, which may be flooded with a potting material so as to insulate the photodetector array 61, while not obscuring the clear aperture 64 of the downstream filter 60A.

Figure 9A:
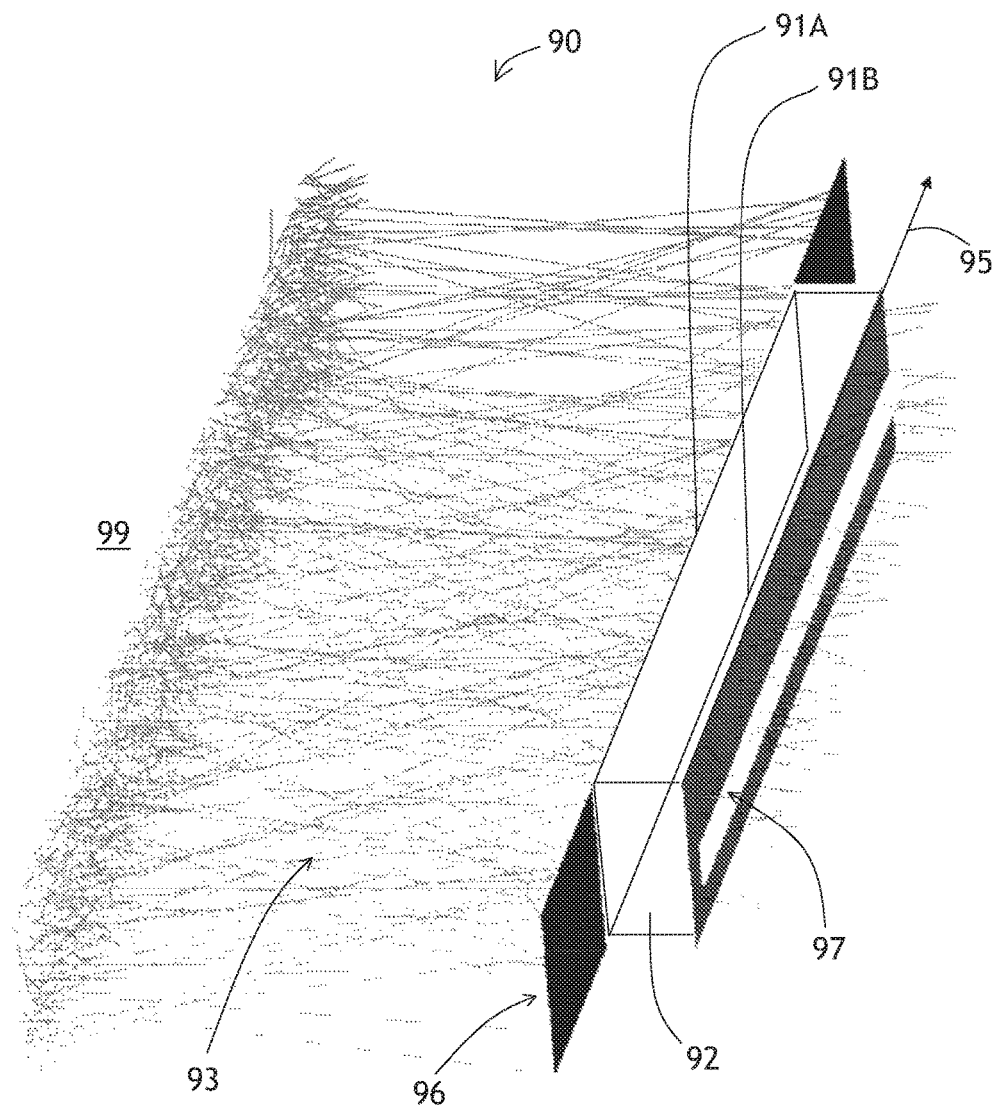
FIGS. 9A and 9B illustrate three-dimensional and side views, respectively, of an optical ray-trace model of optical filters of FIGS. 2A, 3, and 4B.
Figure 9B:
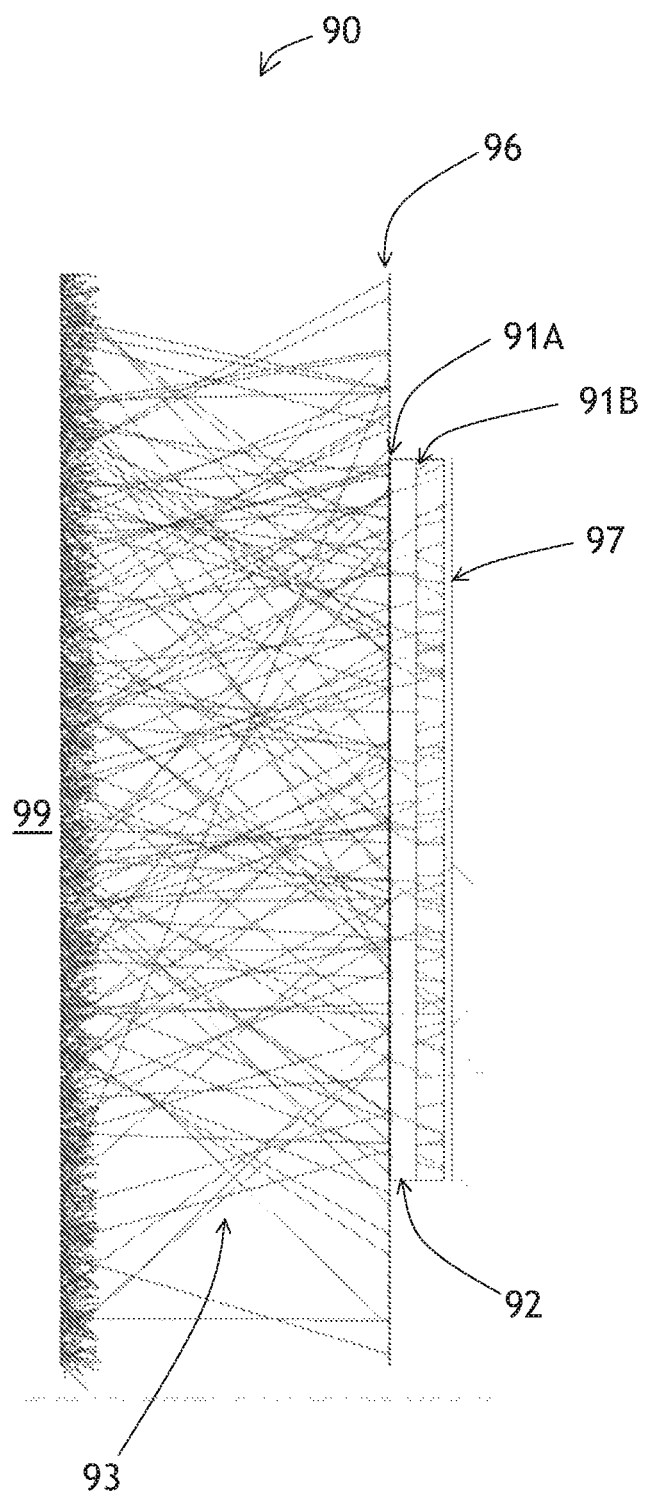

In some embodiments, a ray-trace simulation may be performed to verify the performance of the optical filter 20A of FIG. 2A and similar filters of the present disclosure. Referring to FIGS. 9A and 9B, a ray-trace model 90 may include in sequence a Lambertian light source 99, a rectangular aperture 96, an upstream laterally variable bandpass filter 91A, a transparent spacer 92 having the length L, a downstream laterally variable bandpass filter 91B, and a photodetector 97. Input parameters of the ray-trace model 90 are summarized in Table 1 below. For example, rays 93 were traced in a sufficient number to obtain repeatable results. Each ray 93 had a pre-defined wavelength and carried a pre-defined optical power. Optical power readings were accumulated in bins of the photodetector 97 aligned along a dispersion direction 95, which corresponds to the first direction 25 in FIG. 2A. The constant parameters included the distance from the Lambertian light source 99 to the aperture 96 of 3 mm; size of the photodetector 97 of 6.6 mm×025 mm; and number of bins, or pixels, of the photodetector 97 equal to 838. Varied parameters included bandwidth in % and NA in F/# of the upstream 91A and downstream 91B laterally variable bandpass filters, and thickness of the transparent spacer 92. The Lambertian light source 99 emitted light at eight wavelengths of 0.95 µm; 1.05 µm; 1.15 µm; 1.25 µm; 1.35 µm; 1.45 µm; 1.55 µm; and 1.65 µm.

TABLE 1

| Model # | Diffuser dimensions (L × W mm) | Total power on diffuser (W) | Power density on diffuser (W/mm 2) | Upstream filter 91A | Downstream filter 91B | L (mm) | Distance to detector (mm) |
|---|---|---|---|---|---|---|---|
| REF | 3 × 2.5 | 100.00 | 13.33 | TLP | TLP | 20.0 | 0.07 |
| 1 | 10 × 1 | 133.33 | 13.33 | 1.4% LVF F/#3 | .7% LVF F/#3 | 1.7 | 0.07 |
| 2 | 10 × 1 | 133.33 | 13.33 | 1.4% LVF F/#3 | .7% LVF F/#3 | 1.0 | 0.07 |
| 3 | 10 × 1 | 133.33 | 13.33 | 1.4% LVF F/#3 | .7% LVF F/#5 | 1.7 | 0.07 |
| 4 | 10 × 1 | 133.33 | 13.33 | 1.4% LVF F/#3 | .7% LVF F/#5 | 1.0 | 0.07 |

Figure 10:
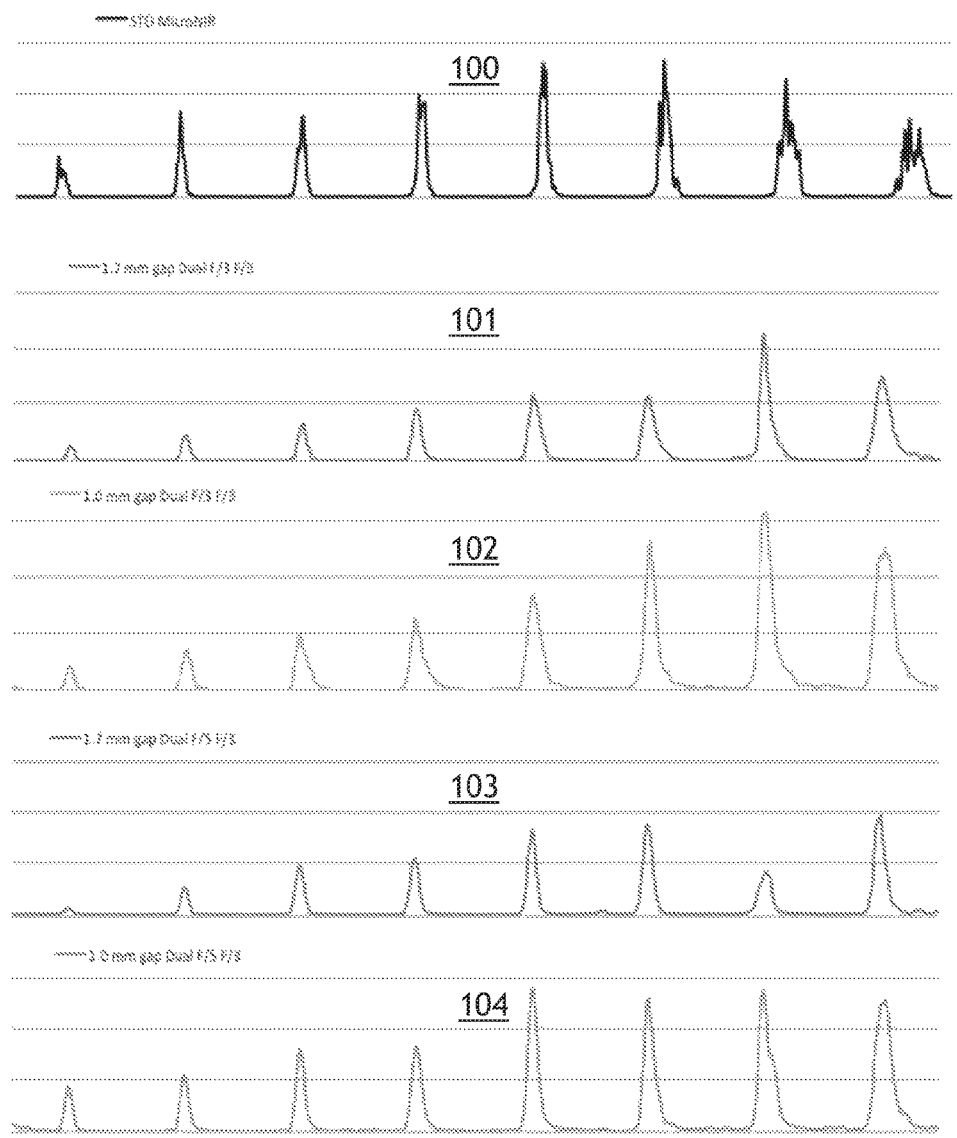
FIG. 10 illustrates a superimposed view of simulated optical power distributions of the optical ray-trace model of FIGS. 9A, 9B at different numerical apertures and distances between upstream and downstream filters.

Referring to FIG. 10, simulation results are presented in form of optical power distributions accumulated in bins of the photodetector 97 of the optical ray-trace model 90 of FIGS. 9A, 9B. A top graph 100 corresponds to a "reference model"—a simulated commercially available MicoNIR™ spectrometer having a tapered light pipe for light collimation. Plots 101 to 104 correspond to Reference models 1 to 4 respectively of Table 1 above.

Figure 11A:
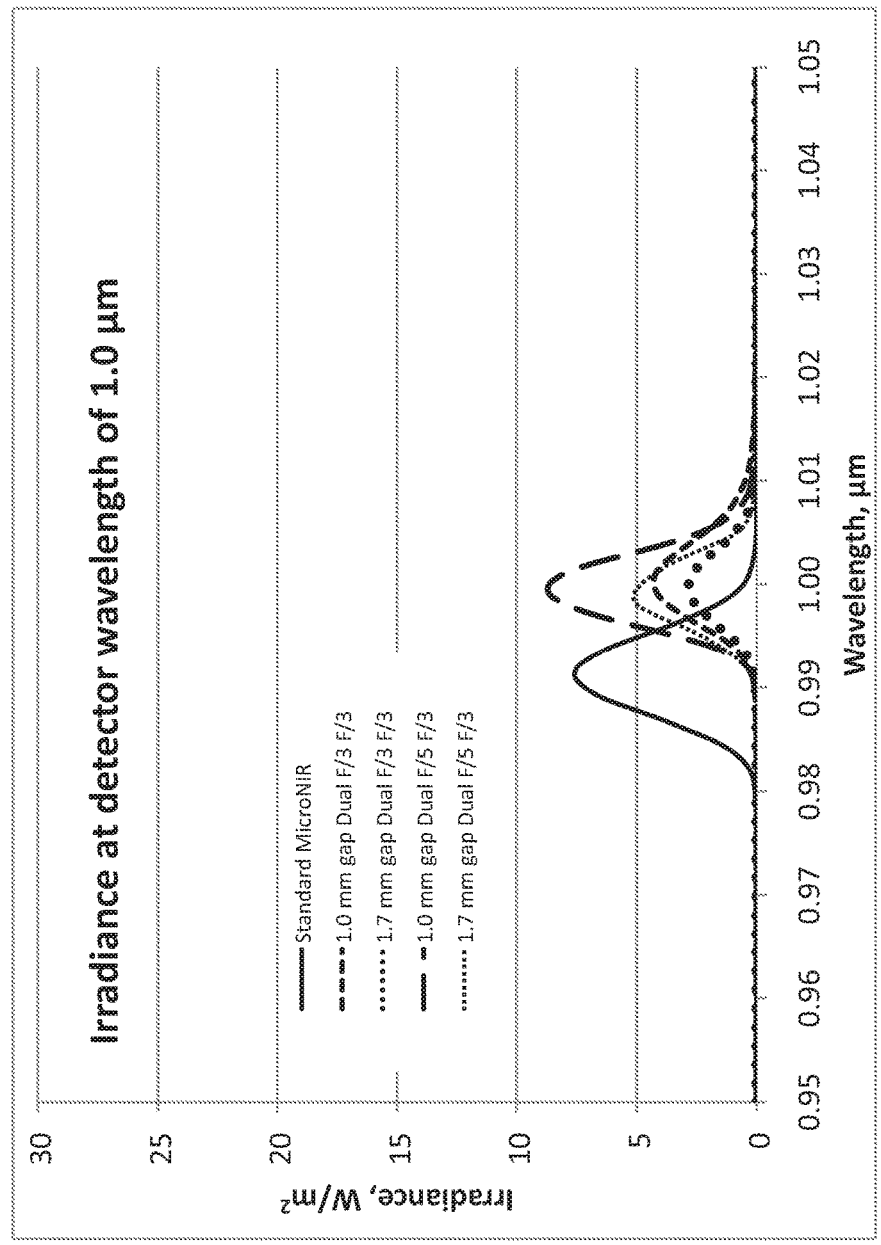
FIGS. 11A, 11B, and 11C illustrate simulated detected optical spectra at wavelengths of 1.0 μm, 1.3 μm, and 1.6 μm, respectively.
Figure 11B:
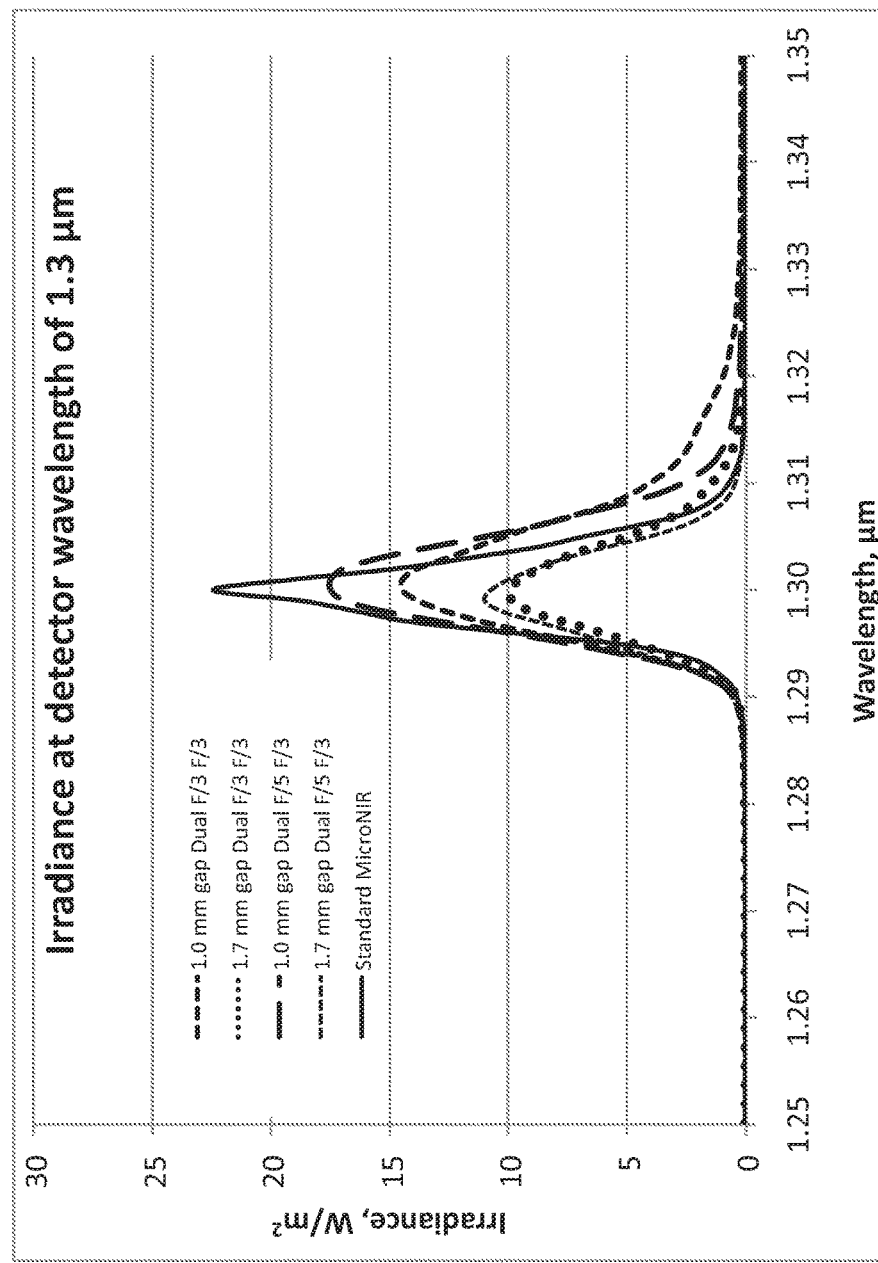
Figure 11C:
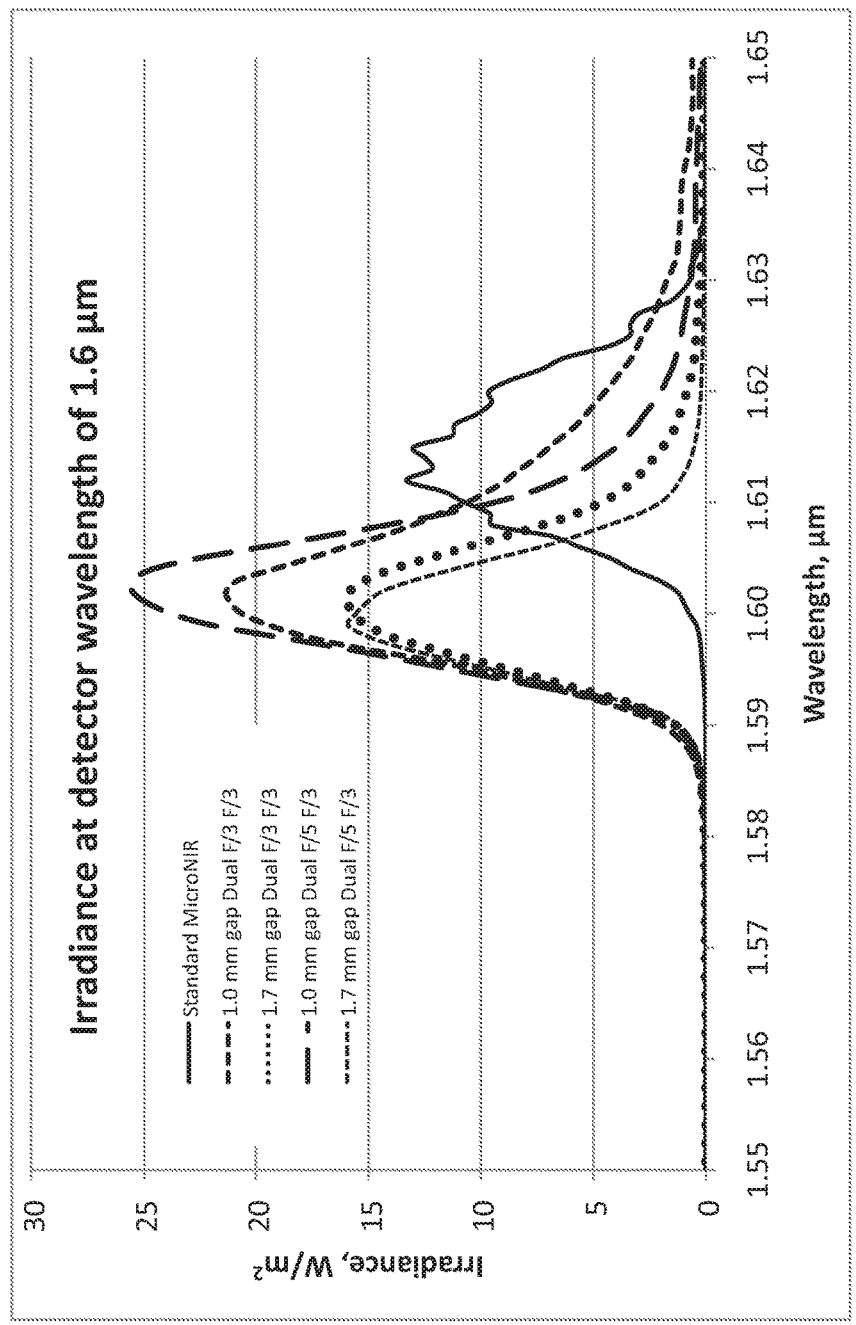
Figure 12:
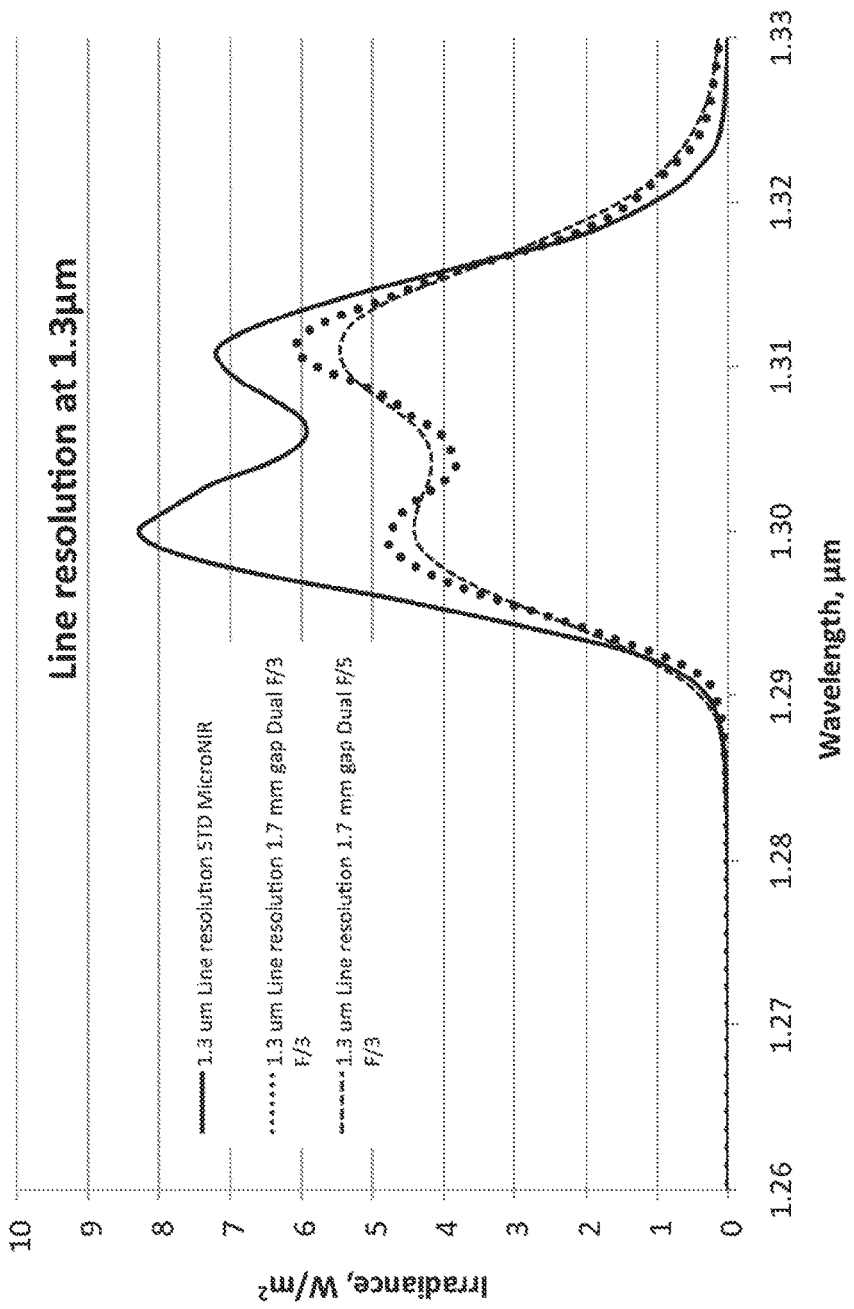
FIG. 12 illustrates a simulated dual-line optical spectrum showing a resolving power of the simulated optical filters of FIGS. 2A, 3A-3B, and 4B.

Turning to FIGS. 11A, 11B, and 11C, a more detailed spectral performance may be simulated at respective wavelengths of 1.0 µm; 1.3 µm; and 1.6 µm. It should be appreciated that Models 1 to 4 illustrated much better wavelength accuracy and similar spectral selectivity. Tuning to FIG. 12, the resolving power of Models 1 and 3 is demonstrated using a dual spectral line at 1.3 µm, at 0.12 µm separation. It should be appreciated that in the results shown in FIG. 10, 11A to 11C, and FIG. 12, Models 1 to 4 did not have a tapered light pipe or another light collimating elements, yet the Models 1 to 4 have shown an acceptable spectral bandwidth. When the tapered light pipe is excluded from the reference model, the spectral selectivity of the reference model becomes unacceptably low.

Table 2 below summarizes the obtained simulated performance of Models 1-4.

TABLE 2

| | Power | | | Resolution | | |
|---|---|---|---|---|---|---|
| Model # | Peak Irrad. @ $\lambda = 1.0$ μm (W/m$^2$) | Peak Irrad. @ $\lambda = 1.3$ μm (W/m$^2$) | Peak Irrad. @ $\lambda = 1.6$ μm (W/m$^2$) | 1.0 μm wavelength | 1.3 μm wavelength | 1.6 μm wavelength |
| REF | 7.6 | 16.7 | 12.2 | 9 | 11 | 17 |
| 1 | 2.8 | 9.9 | 15.9 | 8 | 12 | 15 |
| 2 | 4.3 | 14.5 | 21.3 | 9 | 13 | 15 |
| 3 | 5.1 | 11 | 15.9 | 5 | 9 | 12 |
| 4 | 8.6 | 17.5 | 25.5 | 7 | 12 | 13 |

Figure 13:
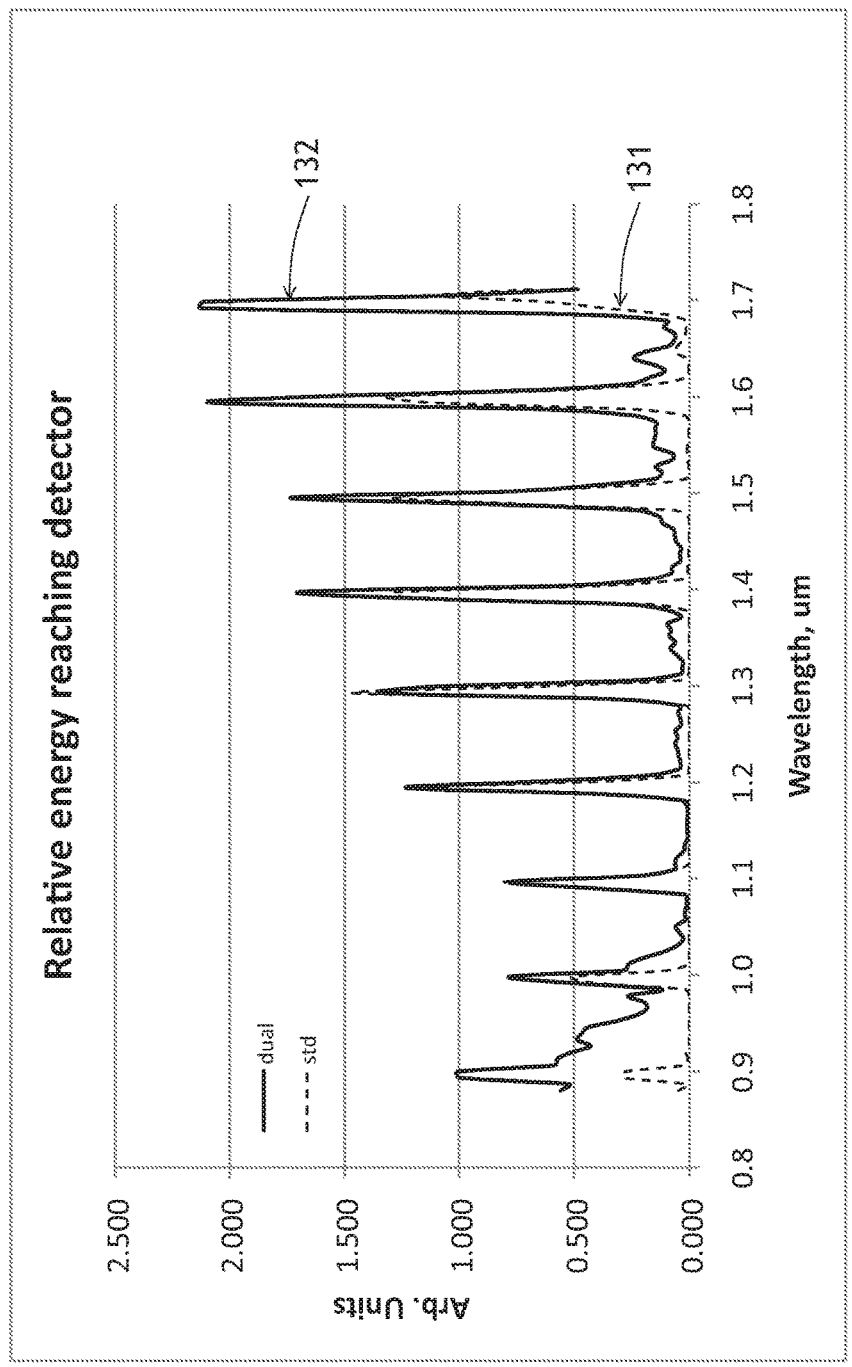
FIG. 13 illustrates a multi-wavelength spectrum of a simulated spectrometer having the optical filter of FIG. 2A, shown in comparison with a multi-wavelength spectrum of a simulated spectrometer having a tapered light pipe collimator and a linear variable filter.

Performance of the optical filter 60A of FIG. 6A may be verified by simulation. Performance of a standard MicroNIR™ spectrometer containing aperture boot, tapered light pipe, InGaAs diode array, was also simulated to provide a reference. Turning to FIG. 13, the standard MicroNIR™ spectrometer performance may be represented by dashed-line spectrum 131 of a multi-wavelength signal between 0.9 μm and 1.7 μm separated by 0.1 μm. Solid-line spectrum 132 illustrates the simulated performance of the spectrometer 60A, which is free of any collimating or light shaping optics. Some stray light between the spectral peaks is attributed to the coating, which has not been optimized for the wavelength range used. The illumination conditions for both measurements were identical.

Figure 14:
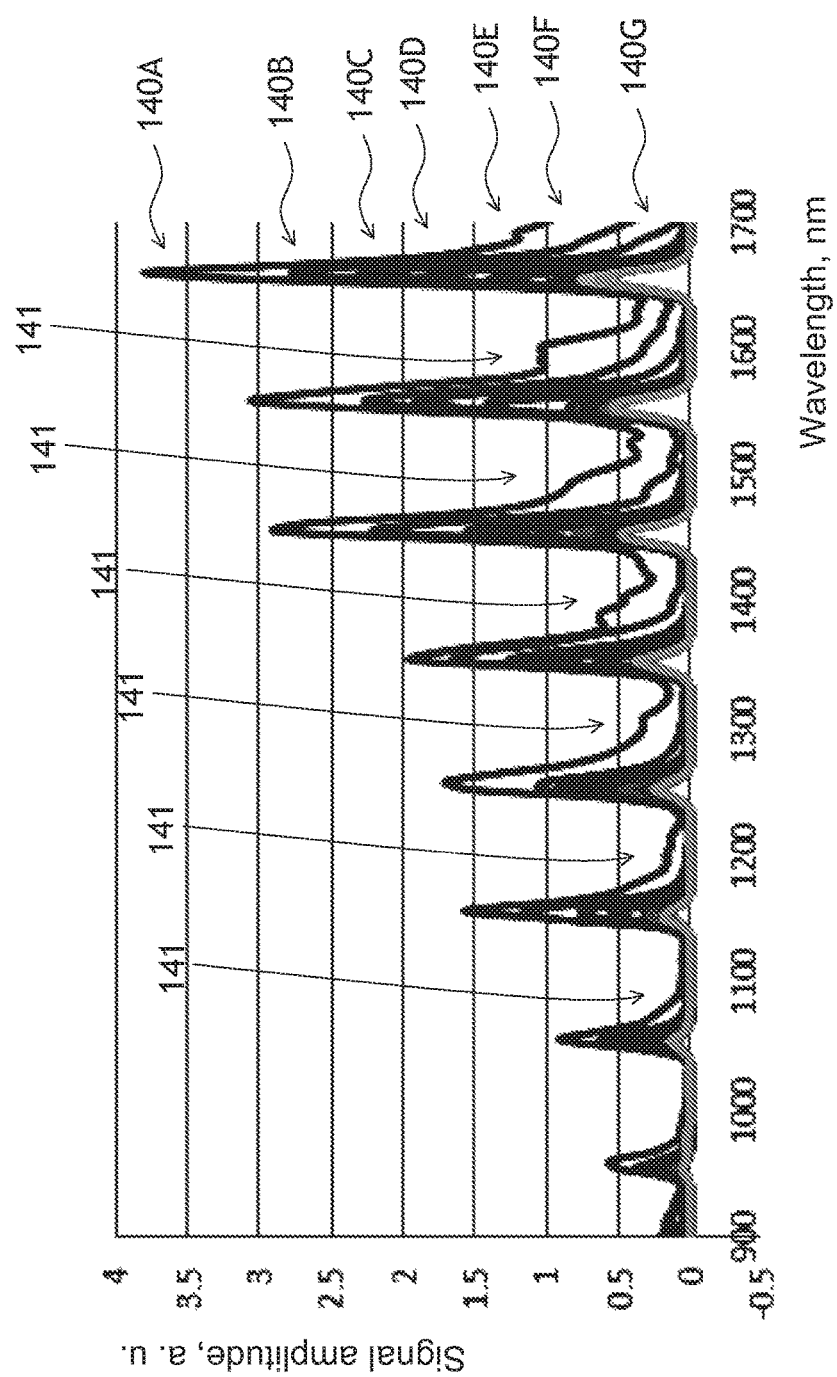
FIG. 14 illustrates simulated spectra of a multi-wavelength light source, obtained with a spectrometer having the optical filter of FIG. 2A at different values of the inter-filter distance L.

Referring to FIG. 14, multi-wavelength spectra 140A-140G were obtained by simulation using the optical filter 20 of FIG. 2A at different values of the inter-filter distance L ranging from 0.2 mm to 30 mm. It should be appreciated that, as the inter-filter distance L increases, the filter throughput decreases, and the out-of-band rejection of stray light 141 improves. This may happen because as the inter-filter distance L increases, the acceptance cone 2θ of the optical filter 20 (FIG. 2C, 3) is reduced.

Turning to FIG. 15A, a spectrometer 150 may include a housing 151 having a window 152. A optical filter 153 may include an upstream laterally variable filter, not shown, physically spaced at 2.08 mm from a downstream laterally variable filter, not shown. The upstream filter, not seen in FIG. 15A, may have the passband of 1.3% of the center wavelength of 1300 nm and 900 nm to 1700 nm range. The upstream filter at the top of the optical filter 153 may have a width of 2 mm, a length of 8 mm, and a thickness of 1.1 mm. The downstream filter may have the passband of 0.8% of the center wavelength of 1300 nm and 900 nm to 1700 nm range. The downstream filter may have a width of 1.4 mm, a length of 7.4 mm, and a thickness of 1.5 mm. A standard 128-pixel detector array, not shown, was placed 80 micrometers away from the downstream filter. An electronic driver 154 was used to driver the detector array.

The optical filter 153 and the electronic driver 154 may also be seen in FIG. 15B, which is a magnified view of FIG. 15A, as symbolically shown with solid lines 155. As shown in FIG. 15B, a scale bar 156 having a length of 5 mm may be used.

Figure 16:
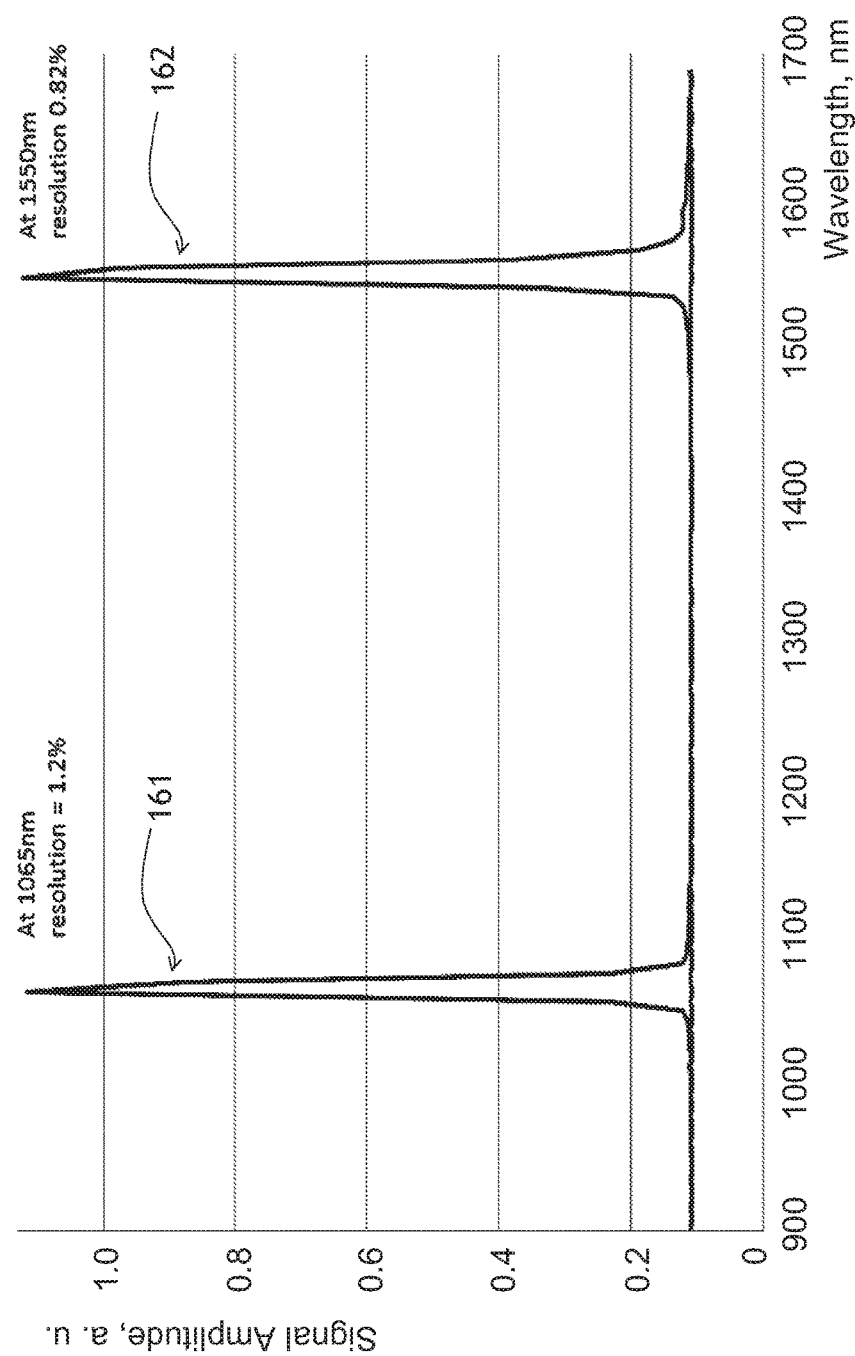
FIG. 16 illustrates monochromatic spectra measured with the spectrometer of FIGS. 15A and 15B.

Referring now to FIG. 16, emission spectrum 161 and 162 were obtained using the spectrometer 150 of FIGS. 15A and 15B. Emission of two laser sources at wavelengths of 1064 nm and 1551 nm was directed, in turn, onto an integrating sphere to create a lambertian illumination source with a switchable emission wavelength. Integration times of the photodetector array were adjusted, so both spectra had the same peak amplitude, because each laser had different power output levels. No other spectral or spatial filters were used for these measurements. The integration sphere had a 25 mm port and was placed 35 mm away from the upstream filter. In both spectra 161 and 162, the wavelength resolution may be limited by the pixel structure of the photodetector array. The instrumental 3 dB bandwidth at 1065 nm may be estimated to be 1.2%·1065 nm=12.8 nm. The instrumental 3 dB bandwidth at 1550 nm may be estimated to be 0.82%·1550 nm=12.7 nm.

Figure 17:
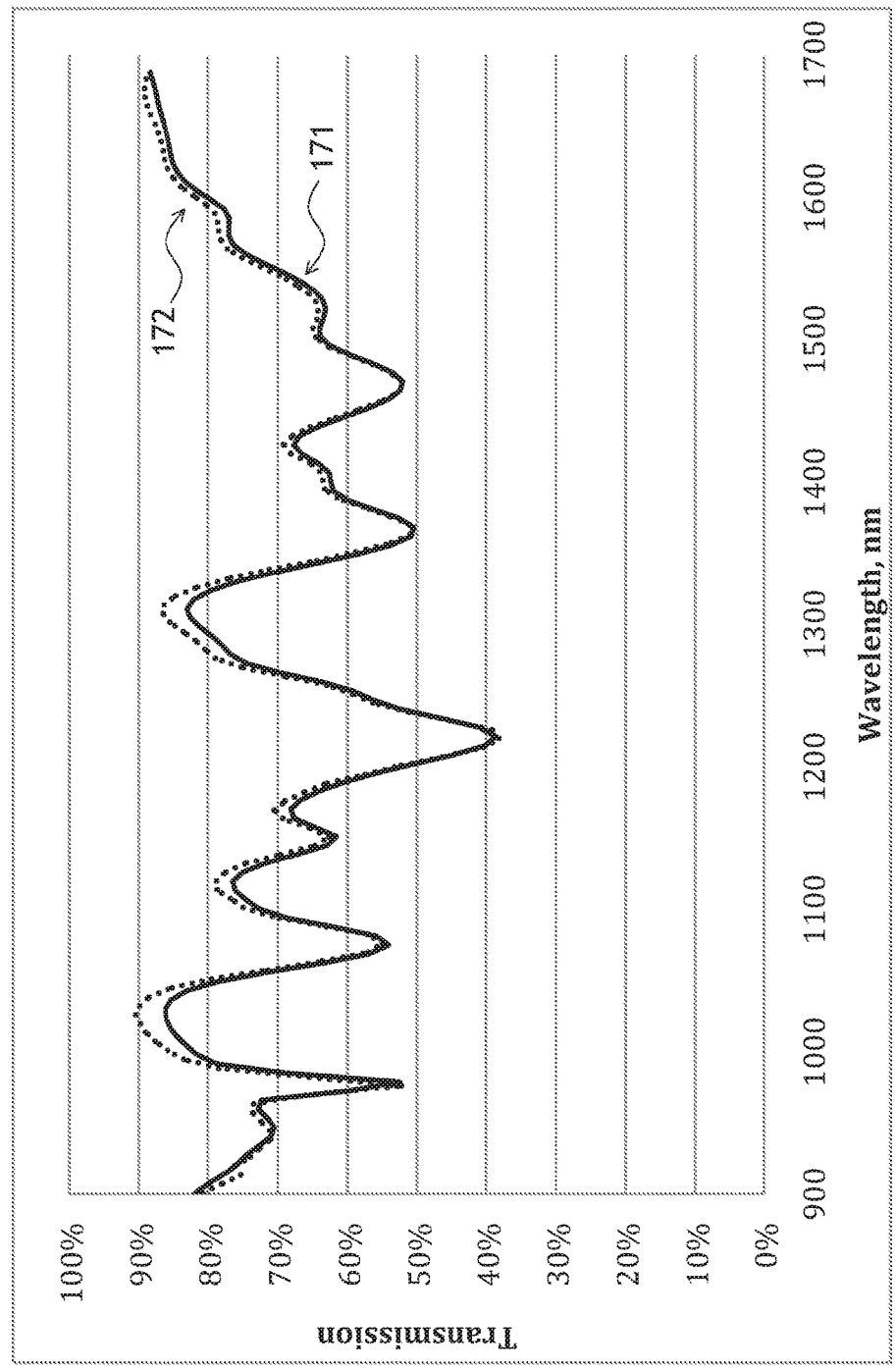
FIG. 17 illustrates optical transmission spectra of a doped glass sample measured with the spectrometer of FIGS. 15A, 15B, and compared to a transmission spectrum of the doped glass sample measured with a standard MicroNIR™ spectrometer.

Turning to FIG. 17, transmission spectra 171 and 172 were obtained using a NIST traceable transmission reference (in this case an Avian doped glass reference WCT2065-025) placed in front of a halogen lamp. The first spectrum 171, shown in solid line, was obtained using the spectrometer 150 of FIGS. 15A and 15B. The second spectrum 172, shown in dotted line, was obtained using a standard MicroNIR1700 spectrometer manufactured by JDS Uniphase Corporation, Milpitas, Calif., USA.

In both cases, dark-state reference spectra were collected by blocking the light source. White-state reference spectra were collected by removing the doped glass reference from the optical path. One can see that the first spectrum 171 is closely correlated with the second spectrum 172. The first spectrum 171 was obtained with a 1 mm wide aperture placed in front of the spectrometer 150 of FIGS. 15A and 15B. Without the aperture, the resolution was slightly reduced, but the integration (data collection) time decreased by a factor of three.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

At this point it should be noted that an optical filter and spectrometer in accordance with the present disclosure as described above may involve the processing of input data and the generation of output data to some extent. This input data processing and output data generation may be implemented in hardware or software. For example, specific electronic components may be employed in a processor, module, or similar related circuitry for implementing the functions associated with providing an optical filter and/or a spectrometer in accordance with the present disclosure as described above. Alternatively, one or more processors operating in accordance with instructions may implement the functions associated with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optical filter comprising:
a first thin film wedged interference coating deposited on a medium of the optical filter; and
a second thin film wedged interference coating deposited on the medium of the optical filter,
where the first thin film wedged interference coating is deposited on a first side of the medium and the second thin film wedged interference coating is deposited on a second, opposite side of the medium with respect to an optical path of a beam of light, or the medium is located between the first thin film wedged interference coating and the second thin film wedged interference coating, and
where the medium is a single common substrate.

2. The optical filter of claim 1, where the first thin film wedged interference coating is an upstream thin film wedged interference coating.

3. The optical filter of claim 1,
where the optical filter includes an upstream filter and a downstream filter,
where the upstream filter includes the first thin film wedged interference coating, and
where the downstream filter includes the second thin film wedged interference coating.

4. The optical filter of claim 1,
where the medium is a transparent medium having a refractive index n between the first thin film wedged interference coating and the second thin film wedged interference coating.

5. The optical filter of claim 1, where a distance L between the first thin film wedged interference coating and the second thin film wedged interference coating varies.

6. The optical filter of claim 1, where the first thin film wedged interference coating is disposed at an angle relative to the second thin film wedged interference coating.

7. The optical filter of claim 1, further comprising:
an aperture disposed in the optical path.

8. An optical filter comprising:
a first wedged interference coating deposited on a substrate of the optical filter; and
a second wedged interference coating deposited on the substrate of the optical filter,
where the first wedged interference coating is deposited on a first side of the substrate and the second wedged interference coating is deposited on a second, opposite side of the substrate, and
where the substrate is a single common substrate.

9. The optical filter of claim 8,
where the optical filter includes an upstream filter and a downstream filter,
where the upstream filter includes the first wedged interference coating, and
where the downstream filter includes the second wedged interference coating.

10. The optical filter of claim 8, where a space exists between the first wedged interference coating and the second wedged interference coating.

11. The optical filter of claim 8, further comprising:
an aperture disposed in an optical path.

12. The optical filter of claim 11, where a width of the aperture varies.

13. A method comprising:
filtering an optical beam,
the optical beam being filtered using an optical filter comprising:
a first thin film wedged interference coating deposited on a first substrate of the optical filter; and
a second thin film wedged interference coating deposited on the substrate of the optical filter,
where
the first thin film wedged interference coating is deposited on a first side of the substrate and the second thin film wedged interference coating is deposited on a second, opposite side of the substrate with respect to an optical path of a beam of light, or
the substrate is located between the first thin film wedged interference coating and the second thin film wedged interference coating, and
where the substrate is a single common substrate.

14. The method of claim 13, where the substrate comprises a transparent medium having a refractive index n between the first thin film wedged interference coating and the second thin film wedged interference coating.

15. The method of claim 13, where a space exists between the first thin film wedged interference coating and the second thin film wedged interference coating.

16. The method of claim 13, where the optical filter further comprises an aperture disposed in the optical path.

17. The method of claim 13, where a distance L between the first thin film wedged interference coating and the second thin film wedged interference coating varies.

18. The method of claim 13, where the first thin film wedged interference coating is an upstream thin film wedged interference coating.

19. The method of claim 13,
where the optical filter includes an upstream filter and a downstream filter,
where the upstream filter includes the first thin film wedged interference coating, and
where the downstream filter includes the second thin film wedged interference coating.

20. The method of claim 13,
where the optical filter includes an upstream filter and a downstream filter,
where the upstream filter includes a sub-wavelength grating, and
where the downstream filter includes a dichroic polymer.

* * * * *